United States Patent
Ball et al.

(10) Patent No.: US 8,402,444 B2
(45) Date of Patent: Mar. 19, 2013

(54) PROGRAM ANALYSIS THROUGH PREDICATE ABSTRACTION AND REFINEMENT

(75) Inventors: Thomas J. Ball, Mercer Island, WA (US); Eleonora O. Bounimova, Redmond, WA (US); Vladimir A. Levin, Redmond, WA (US); Rahul Kumar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 566 days.

(21) Appl. No.: 12/576,253

(22) Filed: Oct. 9, 2009

(65) Prior Publication Data

US 2011/0088016 A1  Apr. 14, 2011

(51) Int. Cl.
G06F 9/44 (2006.01)
(52) U.S. Cl. ........ 717/128; 717/124; 717/125; 717/126; 717/127; 717/129; 717/130; 717/131; 717/132; 717/133; 717/134; 717/135
(58) Field of Classification Search .................. None
See application file for complete search history.

(56) References Cited

U.S. PATENT DOCUMENTS

| | | | |
|---|---|---|---|
| 4,849,810 A * | 7/1989 | Ericsson | 375/240.12 |
| 6,079,031 A | 6/2000 | Haley et al. | |
| 6,125,375 A * | 9/2000 | Atkins et al. | 715/207 |
| 6,904,590 B2 * | 6/2005 | Ball et al. | 717/132 |
| 7,058,925 B2 * | 6/2006 | Ball et al. | 717/106 |
| 7,203,924 B2 | 4/2007 | Rehof et al. | |
| 7,346,486 B2 * | 3/2008 | Ivancic et al. | 703/22 |
| 7,437,666 B2 | 10/2008 | Ramarao | |
| 7,509,534 B2 * | 3/2009 | Rajamani et al. | 714/38.1 |
| 7,526,750 B2 | 4/2009 | Andrews et al. | |
| 7,536,606 B2 | 5/2009 | Andrews et al. | |
| 7,552,119 B2 | 6/2009 | Ting | |
| 7,555,418 B1 | 6/2009 | Qadeer et al. | |
| 7,587,707 B2 | 9/2009 | Ball et al. | |
| 7,653,520 B2 * | 1/2010 | De Moura et al. | 703/2 |
| 7,926,039 B2 * | 4/2011 | Wang et al. | 717/126 |
| 8,046,746 B2 | 10/2011 | Tillmann et al. | |
| 8,051,408 B1 * | 11/2011 | Johnson | 717/125 |
| 8,131,532 B2 * | 3/2012 | Cadambi et al. | 703/22 |
| 2002/0178401 A1 | 11/2002 | Ball et al. | |
| 2003/0204570 A1 | 10/2003 | Rehof et al. | |

(Continued)

OTHER PUBLICATIONS

PSE Explaining Program Failures via Postmortem Static Analysis by Roman Manevich, Manu Sridharan, Stephen Adams, Manuvir Das, and Zhe Yang, SIGSOFT'04/FSE-12, Oct. 31-Nov. 6, 2004, Newport Beach, CA, USA.*

(Continued)

Primary Examiner — Henry Tsai
Assistant Examiner — Jing-Yih Shyu

(57) ABSTRACT

An analysis engine is described for performing static analysis using CEGAR loop functionality, using a combination of forward and backward validation-phase trace analyses. The analysis engine includes a number of features. For example: (1) the analysis engine can operate on blocks of program statements of different adjustable sizes; (2) the analysis engine can identify a subtrace of the trace and perform analysis on that subtrace (rather than the full trace); (3) the analysis engine can form a pyramid of state conditions and extract predicates based on the pyramid and/or from auxiliary source(s); (4) the analysis engine can generate predicates using an increasingly-aggressive series of available discovery techniques; (5) the analysis engine can selectively concretize procedure calls associated with the trace on an as-needed basis and perform other refinements; and (6) the analysis engine can add additional verification targets in the course of its analysis, etc.

21 Claims, 21 Drawing Sheets

U.S. PATENT DOCUMENTS

| | | | |
|---|---|---|---|
| 2003/0204641 | A1 | 10/2003 | Rehof et al. |
| 2003/0204834 | A1 | 10/2003 | Ball et al. |
| 2004/0019468 | A1 | 1/2004 | DeMoura et al. |
| 2005/0086648 | A1 | 4/2005 | Andrews et al. |
| 2005/0149904 | A1 | 7/2005 | Ball et al. |
| 2005/0229044 | A1 | 10/2005 | Ball |
| 2005/0235257 | A1 | 10/2005 | Ball et al. |
| 2005/0257098 | A1 | 11/2005 | Andrews et al. |
| 2006/0247907 | A1 | 11/2006 | Qadeer et al. |
| 2006/0248515 | A1 | 11/2006 | Qadeer et al. |
| 2006/0282807 | A1* | 12/2006 | Ivancic et al. ............... 716/5 |
| 2007/0005633 | A1* | 1/2007 | Ball et al. ............... 707/102 |
| 2007/0168981 | A1 | 7/2007 | Pacheco et al. |
| 2007/0244942 | A1 | 10/2007 | McCamant et al. |
| 2007/0250471 | A1 | 10/2007 | Fontoura |
| 2007/0271204 | A1* | 11/2007 | Jiang ............... 706/6 |
| 2008/0016497 | A1* | 1/2008 | Wang et al. ............... 717/124 |
| 2008/0034353 | A1 | 2/2008 | Rajamani et al. |
| 2008/0104665 | A1 | 5/2008 | Naldurg et al. |
| 2008/0109641 | A1 | 5/2008 | Ball et al. |
| 2008/0114975 | A1 | 5/2008 | Yen |
| 2008/0120321 | A1 | 5/2008 | Liu |
| 2008/0195999 | A1* | 8/2008 | Cohen et al. ............... 717/100 |
| 2008/0215701 | A1 | 9/2008 | Holt |
| 2008/0229261 | A1 | 9/2008 | Rajamani et al. |
| 2008/0244539 | A1 | 10/2008 | Rajamani et al. |
| 2009/0006463 | A1 | 1/2009 | Mehra et al. |
| 2009/0007038 | A1* | 1/2009 | Wang et al. ............... 716/5 |
| 2009/0144698 | A1 | 6/2009 | Fanning et al. |
| 2009/0282289 | A1* | 11/2009 | Nori et al. ............... 714/38 |
| 2010/0005454 | A1* | 1/2010 | Sankaranarayanan et al. ............... 717/127 |
| 2011/0161937 | A1 | 6/2011 | Bounimova |

OTHER PUBLICATIONS

Program Analysis : Foundations of Abstract Interpretation, Lecture 4 by David Schmidt, NYU, Spring 2004.*

Program Analysis as Model Checking of Abstract Interpretations by David Schmidt and Bernhard Steffen, 1998.*

Ball, et al., "Refining Approximations in Software Predicate Abstraction," in TACAS 04: Tools and Algorithms for Construction and Analysis of Systems, Springer-Verlag, 2004, pp. 388-403, accessed at <<http://research.microsoft.com/en-us/um/cambridge/projects/terminator/tacas04.pdf>>, 16 pages.

Ball, et al., "Automatically Validating Temporal Safety Properties of Interfaces," Proceedings of the 8th International SPIN workshop on Model Checking of Software, 2001, pp. 103-122, accessed at <<http://eprints.kfupm.edu.sa/27660/1/27660.pdf>>, 10 pages.

Stokely, et al., "Parallel Assignments in Software Model Checking," Electronic Notes in Theoretical Computer Science, vol. 157, 2006, pp. 77-94, accessed at <<http://www.comlab.ox.ac.uk/Joel.Ouaknine/publications/parallel05.pdf>>.

Ball, et al., "Boolean Programs: A Model and Process for Software Analysis," Microsoft Research Technical Report, MSR-TR-2000-14, Microsoft Corporation, Redmond, WA, accessed at <<http://research.microsoft.com/pubs/69750/tr-2000-14.pdf>>, 31 pages.

Ball, et al., "Zapato: Automatic Theorem Proving for Predicate Abstraction Refinement," Lecture Notes in Computer Science, No. 3114, pp. 457-461, accessed at <<http://research.microsoft.com/en-us/um/cambridge/projects/terminator/cav04.pdf>>, 4 pages.

Microsoft Research SLAM project page, provided by Microsoft Corporation of Redmond, WA, accessed at <<http://research.microsoft.com/en-us/projects/slam/>>, accessed on Oct. 6, 2009, 3 pages.

Ball, et al., "SLAM and Static Driver Verifier: Technology Transfer of Formal Methods inside Microsoft," accessed at <<ftp://ftp.research.microsoft.com/pub/tr/tr-2004-08.pdf>>, Microsoft Research Technical Report, MSR-TR-2004-08, Microsoft Corporation, Redmond, WA, Jan. 28, 2004, 22 pages.

Cook, et al., "Terminator: Beyond Safety," Proceedings of the 18th International Conference on Computer Aided Verification, 2006, accessed at <<http://citeseerx.ist.psu.edu/viewdoc/download?doi=10.1.1.61.3371&rep=rep1&type=pdf>>, 4 pages.

Ball, et al., "The SLAM Project: Debugging System Software via Static Analysis," ACM SIGPLAN Notices, vol. 37, Issue 1, Jan. 2002, accessed at <<http://portal.acm.org/citation.cfm?id=503274>>, 3 pages.

Ball, et al., "Thorough Static Analysis of Device Drivers," ACM SIGOPS Operating Systems Review, vol. 40, Issue 4, 2006, pp. 73-85, accessed at <<http://www.cs.kuleuven.ac.be/conference/EuroSys2006/papers/p73-ball.pdf>>, 4 pages.

Ball, et al., "Checking Temporal Properties of Software with Boolean Programs," Proceedings of the Workshop on Advances in Verification, 2000, accessed at <<http://citeseerx.ist.psu.edu/viewdoc/download?doi=10.1.1.37.2739&rep=rep1&type=pdf>>, 13 pages.

Godefroid, et al., "Automated Software Testing Using Program Analysis," IEEE Software, vol. 25, Issue 5, Sep. 2008, pp. 30-37, accessed at <<http://research.microsoft.com/pubs/74119/ieeesw2008.pdf>>, 8 pages.

Beckman, et al., "Proofs from Tests," Proceedings of the 2008 International Symposium on Software Testing and Analysis, 2008, accessed at <<http://portal.acm.org/citation.cfm?id=1390634>>, 11 pages.

Ball, et al., "The SLAM Toolkit," Proceedings of the 13th International Conference on Computer Aided Verification, 2001, Lecture Notes in Computer Science, vol. 2102, Springer-Verlag, accessed at <<http://www.springerlink.com/content/53ypg8hgxy7tpywj/>>, pp. 260-264.

Ball, Thomas, "Formalizing Counterexample-Driven Refinement with Weakest Preconditions," Microsoft Research Technical Report, MSR-TR-2004-134, Microsoft Corporation, Redmond, WA, Dec. 10, 2004, accessed at <<http://research.microsoft.com/pubs/70121/tr-2004-134.pdf>>, 20 pages.

Beyer, et al., "The Software Model Checker Blast: Applications to Software Engineering," International Journal on Software Tools for Technology Transfer, vol. 9, Issue 5, 2007, accessed at <<http://www.sosy-lab.org/~dbeyer/Publications/2007-STTT.The_Software_Model_Checker_BLAST.pdf>>, pp. 505-525.

Ball, et al., "Boolean and Cartesian Abstractions for Model Checking C Programs," Microsoft Research Technical Report, MSR-TR-2000-115, Microsoft Corporation, Redmond, WA, Dec. 5, 2000, accessed at <<http://citeseerx.ist.psu.edu/viewdoc/download;jsessionid=6A386B17FCF115D1B4CB87530EB22671?doi=10.1.1.22.3177&rep=rep1&type=pdf>>, 19 pages.

Ball, et al., "Automatic Predicate Abstraction of C Programs," ACM SIGPLAN Notices, vol. 36, Issue 5, 2001, pp. 203-213, retrieved at <<http://www.cs.ucla.edu/~todd/research/pldi01.pdf>>, 11 pages.

Ball, et al., "SLIC: A Specification Language for Interface," Microsoft Research Technical Report, MSR-TR-2001-21, Microsoft Corporation, Redmond, WA, Jan. 10, 2002, accessed at <<http://research.microsoft.com/pubs/69906/tr-2001-21.pdf>>, 12 pages.

Ball, et al., "Bebop: A Symbolic Model Checker for Boolean Programs," Proceedings of the 7th International SPIN Workshop on SPIN Model Checking and Software Verification, 2000, accessed at <<http://spinroot.com/spin/Workshops/ws00/18850115.pdf>>, 20 pages.

de Moura, L., et al., "Z3: An Efficient SMT Solver," in *Tools and Algorithms for the Construction and Analysis of Systems*, vol. 4963/2008, Apr. 3, 2008, pp. 337-340.

Microsoft Havoc home page, Microsoft Corporation, Redmond, WA, accessed at <<http://research.microsoft.com/en-us/projects/havoc/>>, accessed on Dec. 29, 2009, 2 pages.

Diao, Y. et al.; "Path Sharing and Predicate Evaluation for High-Performance XML Filtering"; ACM Trans. Database Syst.; vol. 28, No. 4; Dec. 2003; pp. 467-516.

Flanagan, C. et al.; "Predicate Abstraction for Software Verification"; ACM SIGPLAN vol. 37, Issue 1; Jan. 2002; pp. 191-202.

Kovacs, L. et al.; "Finding Loop Invariants for Programs over Arrays Using a Theorem Prover"; 2009; pp. 470-485.

* cited by examiner

| ORIGINAL C PROGRAM | ABSTRACTED PROGRAM: SINGLE BOOLEAN VARIABLE b0: {x==y} |
|---|---|
| if (x==y){<br>   return;<br>}<br>else{<br>   SLIC_ERROR:;<br>} | if (*){<br>   b0 := schoose() and constrain(b0)<br>   return;<br>}<br>else{<br>   b0 := schoose() and constrain(!b0)<br>   SLIC_ERROR:;<br>} |

| C PROGRAM | PYRAMID STRUCTURE FOR SINGLE COLUMN DISCOVERY (FIRST MODE) | | | |
|---|---|---|---|---|
| 1: void main(){<br>2:　int x, y, a = 1;<br>3:　x = y;<br>4:　x = x+1;<br>5:　if(a>0) a++;<br>6:　if(x == y+2){<br>7:　　　SLIC_ERROR;<br>8:　}<br>9: } | line | 0 | 1 | 2 |
| | 3 | True | False | !(a>0) |
| | 3 | True | y+1==y+2 | !(a>0) |
| | 4 | True | x+1==y+2 | !(a>0) |
| | 5 | True | x==y+2 | !(a>0) |
| | 6 | True | x==y+2 | |
| | 7 | True | | |

FIG. 18

PYRAMID STRUCTURE FOR MULTIPLE
COLUMN DISCOVERY (SECOND MODE)

| line | 0 | 1 | 2 |
|---|---|---|---|
| 3 | True | False | False |
| 3 | True | y+1==y+2 | !(a>0) |
| 4 | True | x+1==y+2 | !(a>0) |
| 5 | True | x==y+2 | !(a>0) |
| 6 | True | x==y+2 | |
| 7 | True | | |

FIG. 19

PYRAMID STRUCTURE FOR
DELAYED DISCOVERY (THIRD MODE)

| line | 0 | 1 | 2 |
|---|---|---|---|
| 1 | True | False (ignored) | False |
| 2 | True | False (ignored) | !(1>0) |
| 3 | True | False | !(a>0) |
| 3 | True | y+1==y+2 | !(a>0) |
| 4 | True | x+1==y+2 | !(a>0) |
| 5 | True | x==y+2 | !(a>0) |
| 6 | True | x==y+2 | |
| 7 | True | | |

| C PROGRAM | PYRAMID STRUCTURE | | | |
|---|---|---|---|---|
| 1: void main(){<br>2:　int x, y;<br>3:　x = y;<br>4:　x = incr(x);<br>5:　if(x == y+2)<br>6:　　SLIC_ERROR;<br>7: }<br>8: int incr(int z){<br>9:　int w = z+1;<br>10:　return (w);<br>　} | line | step | 0 | 1 |
| | 3 | 0 | True | False |
| | 3 | 1 | True | y+1==y+2 |
| | 4 | 2 | True | x+1==y+2 |
| | 9 | 3 | True | z+1==y+2 |
| | 10 | 4 | True | w==y+2 |
| | 5 | 5 | True | x==y+2 |
| | 6 | 6 | True | |

FIG. 22

| C PROGRAM | PYRAMID STRUCTURE | | | | | | |
|---|---|---|---|---|---|---|---|
| 1: void main(){<br>2:　int x, y,a;<br>3:　x = y;<br>4:　x = incr(x);<br>5:　if(!(a>0)) a++;<br>6:　if(x == y+2)<br>7:　　SLIC_ERROR;<br>8: }<br>9:　int incr(int z){<br>10:　return (z+1); }<br>11: } | line | step | 0 | 1 | Actv? | 2 | Actv? |
| | 3 | 0 | True | False | Yes | a>0 | Yes |
| | 3 | 1 | True | y+1==y+2 | Yes | a>0 | Yes |
| | 4 | 2 | True | x+1==y+2 | Yes | a>0 | Yes |
| | 9 | 3 | True | z+1==y+2 | Yes | a>0 | No |
| | 10 | 4 | True | z==y+2 | Yes | a>0 | No |
| | 5 | 5 | True | x==y+2 | Yes | a>0 | Yes |
| | 6 | 6 | True | x==y+2 | Yes | | |
| | 7 | 7 | True | | | | |

FIG. 23

PROGRAM ANALYSIS THROUGH PREDICATE ABSTRACTION AND REFINEMENT

BACKGROUND

Static analysis involves analyzing a program without actually dynamically testing the program code through execution. Like dynamic testing, static analysis can discover errors in the program. Unlike dynamic testing, static analysis is neutral with respect to the distinction between typical scenarios and corner case scenarios. (Corner case scenarios are associating with atypical operating conditions). As a result, static analysis can often find corner case errors that are difficult to discover with dynamic testing. Also, unlike dynamic testing, static analysis can better guarantee that a program lacks errors of certain categories (in the case that the static analysis fails to find such errors in the program). Because of these features, developers and other individuals now routinely rely on static analysis tools to complement more traditional dynamic testing tools. Static analysis tools have proven especially useful in investigating safety-critical software, such as system software.

Some static analysis tools use a Counter-Example Guided Abstraction Refinement (CEGAR) loop to analyze an input program. In this technology, an abstraction component generates an abstraction of the input program with the intent of determining whether or not the program satisfies a property under investigation. A model checking component determines whether error states associated with the property are reachable. The model checking concludes that the program is free of defects (with respect to the property under investigation) if the error states are not reachable. On the other hand, if the model checker can reach an error state, it identifies an error trace which represents a sequence of program statements which lead to the error state. The trace can represent either a feasible trace (which represents an actual error in the program) or an infeasible trace (which does not represent an actual error). The CEGAR loop may generate infeasible traces because it is operating on a sometimes highly abstracted version of the input program that does not represent the full wealth of program states in that program.

The CEGAR loop next employs a validation component to determine whether the trace presents a feasible or infeasible trace. If the validation component concludes that the candidate trace is feasible, then the CEGAR loop has identified an actual error in the program. If the validation component concludes that the candidate trace is infeasible, then it next attempts to provide an explanation that accounts for why the program abstraction generated an inaccurate trace. In doing so, the validation component can identify one or more predicates. Predicates represent relations between variables, properties, etc.; the variables and properties, in turn, may pertain in various ways to the instrumented program being analyzed.

The abstraction component next generates a new abstraction of the input program on the basis of a current set of predicates which includes the newly discovered predicates. The model checking component then repeats its reachability analysis on the new abstraction generated by the abstraction component. The new abstraction will prevent the model checking component from reaching the error state along the same trace that it previously identified. However, the model checking component may still identify another trace that leads to an error state. In the manner described above, the CEGAR loop can repeat its validation, abstraction, and checking operations a plurality of times in order to reach a final conclusion as to whether or not the program satisfies the property under investigation (if such a final conclusion can be reached, which is not guaranteed).

CEGAR loop functionality has amply proven its usefulness in recent years. Representative tools that use CEGAR loop functionality go by the acronyms of Slam, Moped, Blast, F-Soft, Magic, and so on. For example, a first generation of the Slam product, provided by Microsoft Corporation of Redmond, Washington, is well-documented in the technical literature, e.g., as described in: Ball, et al., "The SLAM Project: Debugging System Software via Static Analysis," in *Proceedings of the 29th ACM SIGPLAN-SIGACT Symposium on Principles of Programming Languages*, 2002, pp. 1-3; Ball, et al., "The SLAM Toolkit," in *Proceedings of the 13th International Conference on Computer Aided Verification*, 2001, pp. 260-264; and Ball, et al., "Thorough Static Analysis of Device Drivers," in *Proceedings of the 2006 EuroSys Conference*, 2006, pp. 73-85.

CEGAR loop functionality, while successful, is being asked to analyze programs and systems of increasing complexity and sophistication. There remains ample room for improving the efficiency and effectiveness of CEGAR loop functionality to keep pace with increasing demands placed on this functionality.

SUMMARY

An analysis engine is described herein for performing static analysis using a Counter-Example Guided Abstraction Refinement (CEGAR) loop. The analysis engine includes a number of features to improve scalability, performance, and effectiveness compared to other static analysis tools. Further, the analysis engine includes features to reduce the number of cases in which the CEGAR loop terminates without providing a conclusive result (e.g., because the CEGAR loop is unable to discover new predicates or take other actions to refute an infeasible trace). Further, the analysis engine includes features to reduce the number of false positive errors reported.

According to one illustrative feature, the analysis engine provides an abstract IR (AIR) generating module. The AIR-generating module performs abstraction of an input intermediate representation (IR) program using adjustable blocks of statements, instead of single statements, to thereby generate an abstract IR (AIR) program. The AIR program serves as an interface between the input program and the CEGAR loop. This functionality thus allows the CEGAR loop to operate in a manner which is independent of the language of the input program as well as the granularity of abstraction.

According to another illustrative feature, the analysis engine provides a validation module which combines forward analysis and backward analysis on a candidate error trace. Forward analysis processes the trace in stepwise fashion by advancing away from the beginning of the trace. Backward analysis processes the trace in stepwise fashion by advancing towards the beginning of the trace.

According to another illustrative feature, the analysis engine uses the forward analysis to collect information about the trace, for later use by the backward analysis. The forward analysis can also attempt to identify easily-detectable contradictions in the trace (by processing the trace in the forward direction). If the forward analysis discovers such a contradiction (indicative of an infeasible trace), the forward analysis module can: (i) modify the AIR program (to refute the infeasible trace); or (ii) truncate the trace to provide a subtrace for processing by the backward analysis; or (iii) discover new predicates and bypass backward analysis, etc. (or some combination thereof).

According to another illustrative feature, the backward analysis performs computation to form aggregate state conditions associated with a trace, thus building a pyramid data structure in the backward direction of the trace. For a particular step in the trace, an aggregate state condition represents a conjunction of state conditions associated with the step; the aggregate state condition represents a precondition with respect to the preceding step. At each step, the backward analysis determines whether the aggregate condition is satisfiable or unsatisfiable, e.g., by consulting a solver module.

According to another illustrative feature, the analysis engine can extract predicates based on the pyramid data structure using different available modes of predicate discovery. Further, the analysis engine can discover various auxiliary predicates which are related to previously discovered predicates in various ways.

According to another illustrative feature, the analysis engine can successively apply increasingly aggressive and computationally expensive techniques to discover predicates. That is, if the analysis engine is not successful in discovering predicates using a first technique, it may call on a second technique that is more computationally "aggressive" compared to the first technique. The analysis engine adopts this approach to find a manageable number of new relevant predicates for refuting an infeasible trace at the next iteration of CEGAR loop.

According to another illustrative feature, the analysis engine can adopt one or more refinement techniques in the course of performing backward analysis. In one such technique, the analysis engine can bypass a procedure call in the trace that has no effect on the validation of the trace. In another technique, the analysis engine can reduce the amount of computation when generating the pyramid data structure by inactivating one or more predicates that are not affected by a particular procedure call (the inactivation being performed in the context or scope of that procedure). In another technique, the analysis engine can add a statement to the beginning of a procedure call to better enforce distinctness of uninitialized pointers, thereby improving the precision of subsequent procedure abstraction.

According to another illustrative feature, the analysis engine can first abstract all procedure calls associated with the trace. The analysis engine can then incrementally concretize the procedure calls on an as-needed basis. That is, at a particular juncture of the analysis, the analysis engine can selectively concretize those procedure calls that affect verification of a particular property, leaving the remainder in abstract form.

According to another illustrative feature, the analysis engine can identify new verification targets in the course of its analysis, e.g., in an "on-the-fly" manner. These new targets may differ from the initial properties being investigated. In due course, the analysis engine can re-instrument the input program with the objective of investigating a newly discovered verification target.

According to another illustrative feature, the analysis engine can refine the processing of a program that has loops by iteratively introducing loop conditions to the CEGAR loop on an as-needed basis.

The above functionality can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 18 shows a program excerpt and an accompanying pyramid data structure, illustrating the discovery of predicates in a first mode of discovery.

FIG. 19 shows another pyramid data structure, here illustrating the discovery of predicates using a second mode of discovery.

FIG. 22 shows a program excerpt having a procedure call and an accompanying pyramid data structure produced on the basis of that program.

FIG. 23 shows a program excerpt and an accompanying pyramid data structure, here indicating how the backward analysis module can deactivate a predicate that is not relevant to a procedure call.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth an analysis engine for performing static analysis on programs using improved CEGAR loop functionality. The disclosure begins with an overview of the analysis engine. Subsequent sections describe individual components of the analysis engine in further detail.

Figure 28:
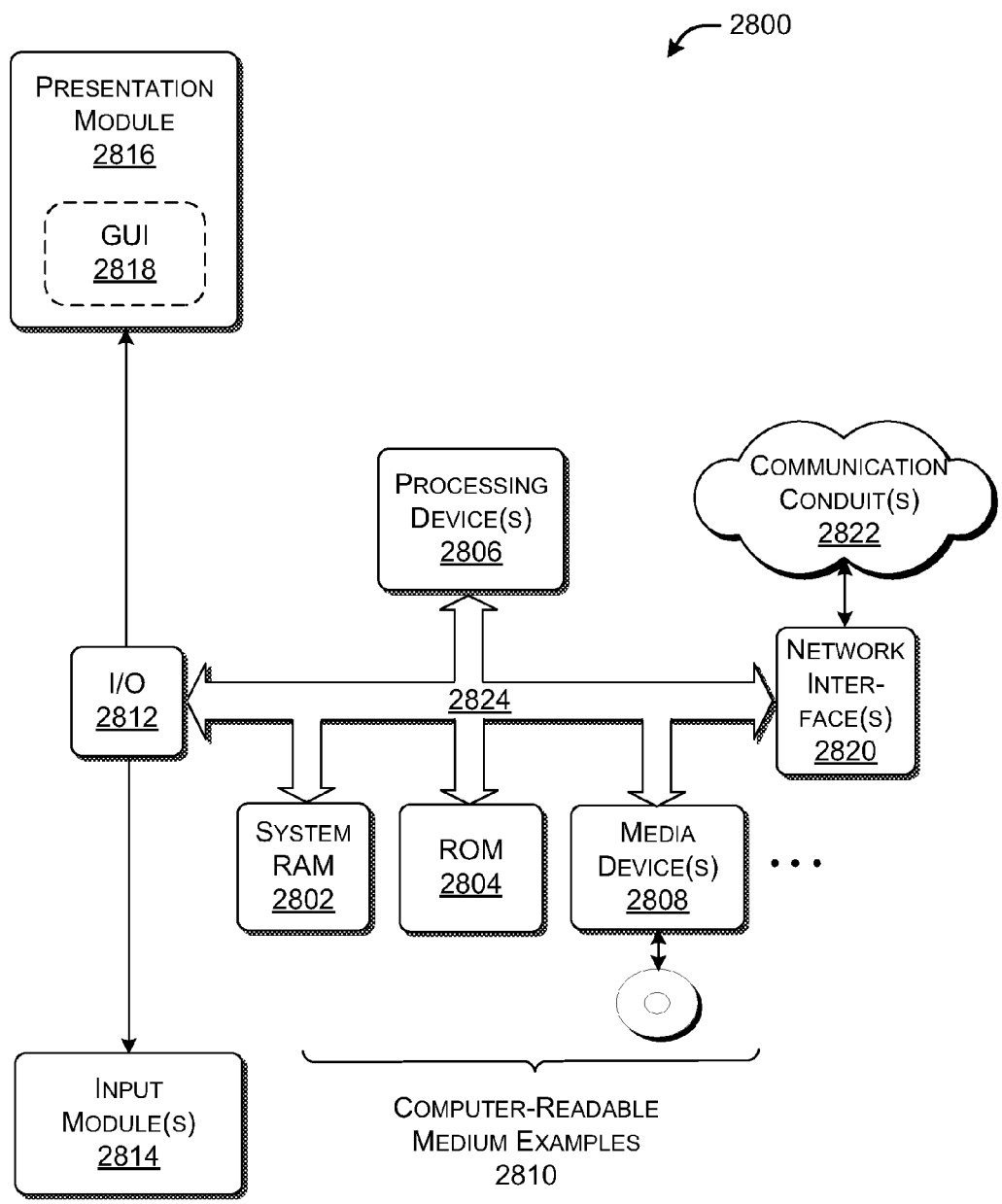
FIG. 28 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 28, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

As to terminology, the phrase "configured to" or the like encompasses any way that any kind of functionality can be constructed to perform an identified operation. The term "logic component" or the like encompasses any functionality for performing a task. For instance, each operation illustrated in the flowcharts corresponds to a logic component for performing that operation. When implemented by a computing system, a logic component represents an electrical component that is a physical part of the computing system, however implemented. Finally, the terms "exemplary" or "illustrative" or the like refer to one implementation among potentially many implementations.

A. Overview of an Illustrative Operating Environment

Figure 1:
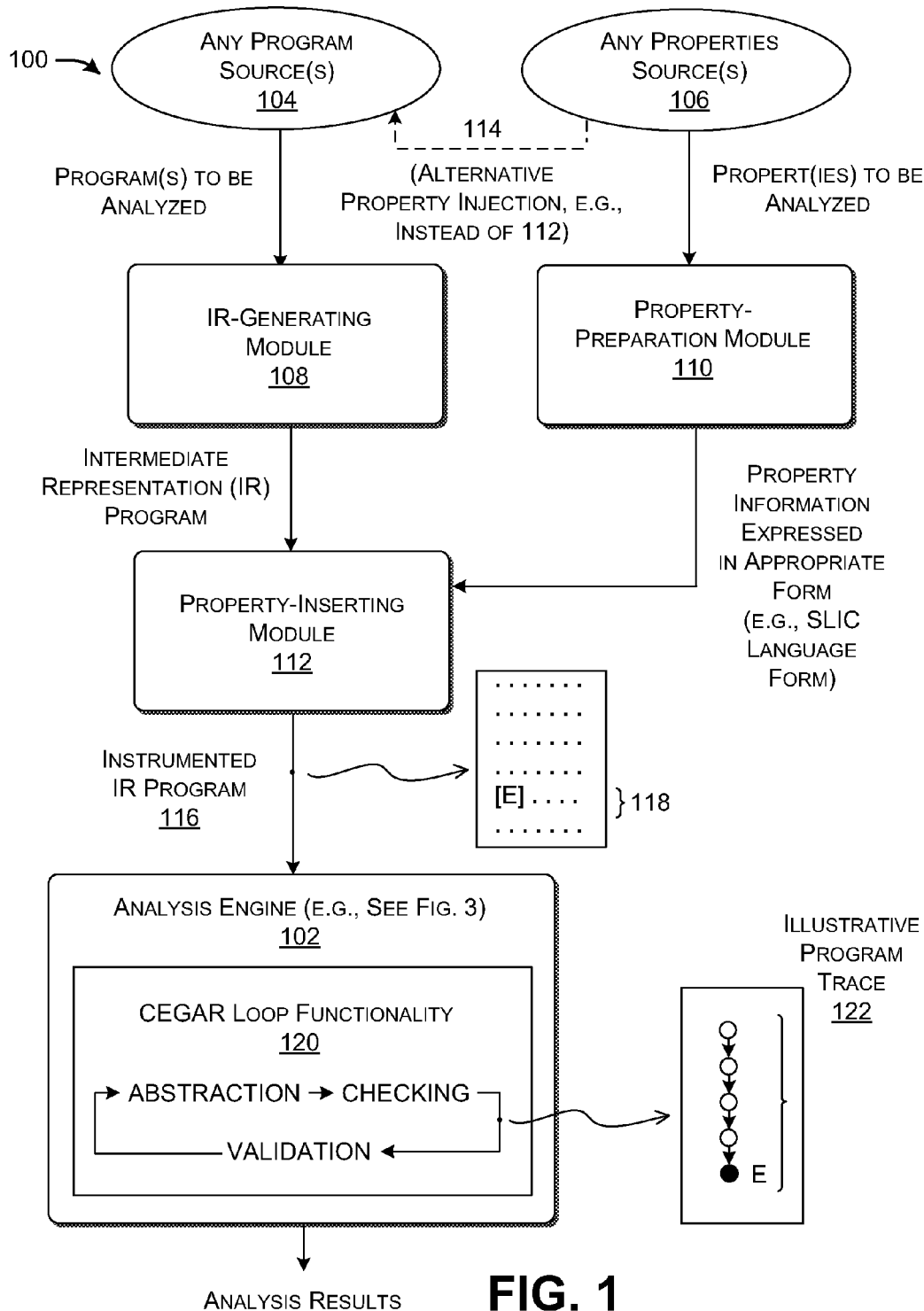
FIG. 1 shows an overview of a system that uses an analysis engine that provides static analysis of a program of any type.
Figure 2:
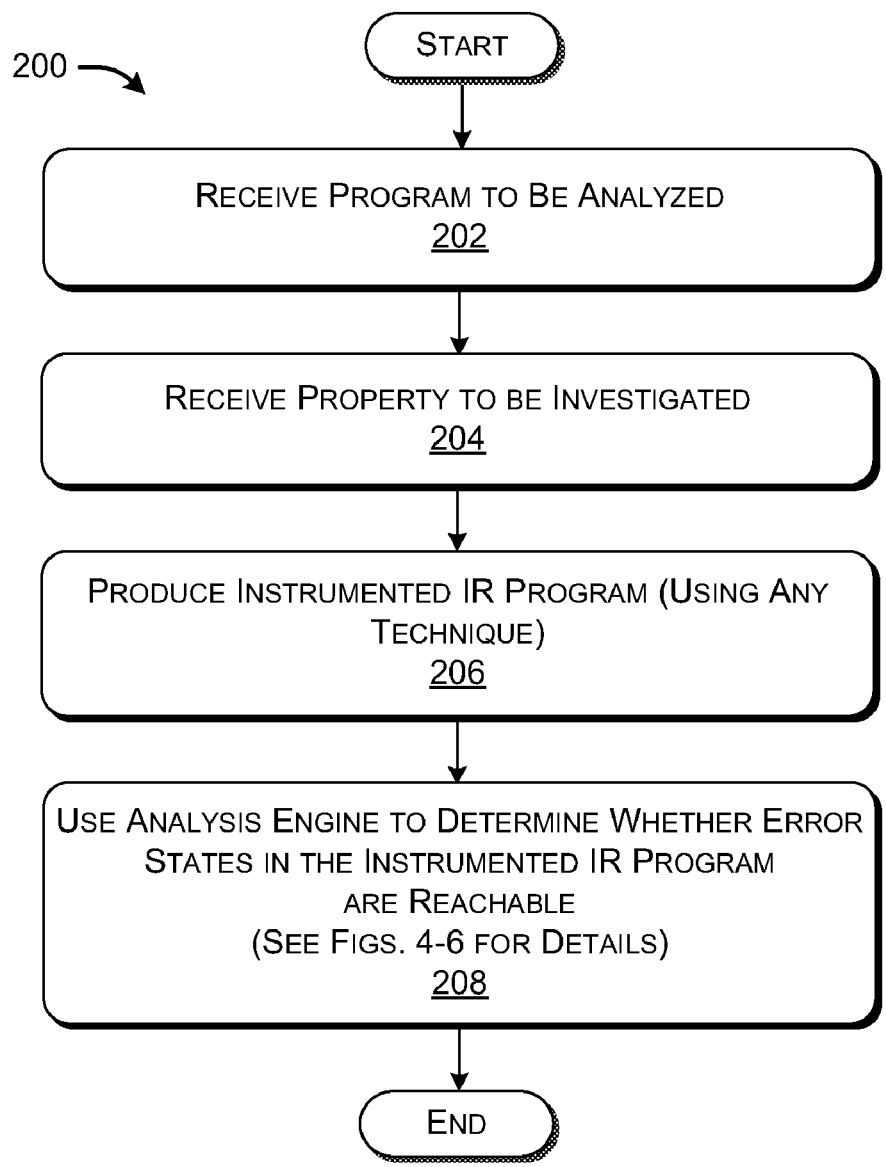
FIG. 2 is a flowchart that describes one manner of operation of the system of FIG. 1.

FIG. 1 shows an overview of a system 100 which employs an analysis engine 102 to analyze an input program. The analysis engine 102 employs static analysis to determine whether the input program satisfies an identified property. FIGS. 1 and 2 present an overview of the system 100 as a whole, while FIGS. 3-6 present an overview of the analysis engine 102 itself. Later sections present further detail on individual features of the analysis engine 102.

The system 100 accepts an input program from any source 104 (or any combination of sources). In one case, the input program may form part of system software, such as aspects of an operating system. In another case, the input program may correspond to components which interact with system software, such as various device drivers and services. However, no limitation is placed on the source 104 of an input program. For instance, the system 100 can be applied to investigate an application program created by a user. Moreover, no limitation is placed on the language used by the input program. In the examples presented herein, the input program is expressed in the C language.

In some cases, the input program represents a standalone piece of software for investigation. In other cases, the input program may combine two or more different sources of program code. For example, in the case of device driver code, the input program may correspond to a combination of program code that is associated with the device driver per se, as well as features of the operating system with which the device driver interacts. It is appropriate to make this combination because the analysis engine 102 does not dynamically run the input program; rather, it statically explores the paths or behaviors associated with the input program. Since the analysis engine 102 will not otherwise "know" about the operating system, it is appropriate for the analysis engine 102 to account for the relevant functionality of the operating system.

Likewise, the property may originate from any source 106 (or any combination of sources). A property refers to behavior associated with the input program that is the focus of investigation. For example, assume that the input program corresponds to a device driver which interfaces with an operating system of a computer device. A property can specify that it is an error to acquire a spin lock twice in a row, or to release a spin lock twice in a row; in other words, the property specifies that a spin lock must first be acquired to be released. The purpose of the system 100 in this context is to verify that the input program does produce an unfavorable result by violating this rule. This type of property represents an example of a temporal safety property which describes a potential malfunction that may occur during the execution of the input program. The property may pertain to behavior of the input program per se, or to behavior exhibited by a more encompassing processing environment in which the program operates.

An IR-generating module 108 converts the input program into an intermediate representation (IR) of the input program. That is, the IR-generating module 108 produces an IR program. The IR-generating module 108 can apply any type of transformation to produce the IR program; such transformations are well known in the field (for example, modern compilers commonly transform input source code into an intermediate representation).

A property-preparation module 110 translates or transforms the property into a form that allows the property to be integrated into the IR program. As used herein, the term property information refers to the output of the property-preparation module 110. The property-preparation module 110 can apply any known technique for performing this transformation. For example, the property-preparation module 110 can use the SLIC language to perform this transformation, as described, for instance in: Ball, et al., "Thorough Static Analysis of Device Drivers," in *Proceedings of the 2006 EuroSys Conference,* 2006, pp. 73-85; and Ball, et al., "SLIC: A Specification Language for Interface Checking,"

Microsoft Research Technical Report No. MSR-TR-2001-21, Jan. 10, 2002. In this context, the property information can be expressed as a rule to be verified by the analysis engine 102.

A property-inserting module 112 integrates the IR program with the property information produced by the property-preparation module 110. In one implementation, the property-inserting module 112 injects fragments of the property information into relevant points in the IR program. For example, the property-inserting module 112 injects new variables from the property information into the IR program. Also, the property-inserting module 112 injects initialization and update assignments for the new variables (and checks over their values) into the IR program. Further, the property-inserting module 112 updates call sites of the procedures mentioned in the property information by inserting additional procedure calls that perform checks (for example, over values of their actual parameters when needed). Further, the property-inserting module 112 can insert abort statements (or the like) into the IR program at the points at which the property information is deemed to be violated.

The system 100 can use other ways to integrate the property information into the IR program. As illustrated by optional path 114, for instance, the system 100 can alternatively add the property information directly to the input program. In this case, the system 100 can omit the operation performed by the property-inserting module 112.

As a result of the operations described above, the system 100 produces a so-called instrumented IR program 116. The IR program is "instrumented" insofar as the property-inserting module 112 modifies the input program with respect to the property information. As described, the instrumented IR program 116 can include one or more abort statements or error labels associated with error states in the program, such as the representative error label "E" 118.

The analysis engine 102 uses CEGAR loop functionality 120 with the objective of determining whether it is possible to reach the error states in the instrumented IR program. Hence, the analysis engine 102 transforms the error analysis task into a state-reachability problem. In terms of broad outline, the CEGAR loop functionality 120 operates by producing an abstraction of the instrumented IR program 116 with respect to a current set of predicates. A predicate describes a relationship between variables, or a property, etc. The variables, properties, etc. may directly or indirectly originate from the input program, the property information, or some other source which pertains to the focus of investigation. The CEGAR loop functionality 120 then operates on the abstraction to determine whether it is possible to reach the previously-defined error states. The CEGAR loop functionality 120 may fail to find a path that leads to the error states, in which case it concludes that the input program obeys the property rule under investigation.

Alternatively, the CEGAR loop functionality 120 can identify an error trace (also referred to as a counter-example) which leads to an error state. FIG. 1 illustrates one such illustrative trace 122 in high-level form. The trace includes program steps (to be described in detail below) which lead to the error state. This trace is referred to as a candidate trace herein to emphasize that it may or may not represent an actual error path. The candidate trace may possibly represent an infeasible trace (also referred to as a spurious counter-example) because the abstraction typically represents a coarse version of the original input program that does not capture the full complexity of the input program.

The CEGAR loop functionality 120 next performs validation to determine whether the candidate trace is a feasible trace (representing a valid error) or an infeasible trace (not representing a valid error). Suppose that the verification component of the CEGAR loop functionality 120 determines that the trace is infeasible because this path leads to a contradiction when analyzed with respect to the instrumented IR program. In this case, the CEGAR loop functionality 120 attempts to discover one or more new predicates which account for this inconsistency, again extracted from the input program, the property information, or from some other germane source. The CEGAR loop functionality 120 then produces a new abstraction based on the current set of predicates (which include the newly discovered predicates), followed by a new round of checking and validation.

The CEGAR loop functionality 120 performs this behavior for any number of iterations until it reaches an answer as to whether the input program obeys the property under investigation. Alternatively, in some cases, this task may be undecidable, in which case the analysis engine 102 terminates without providing a definitive answer.

The ensuing discussion sets forth various features of the CEGAR loop functionality 120 which allow it to efficiently and effectively perform the above-described functions. More specifically, the analysis engine 102 includes a number of features that improve scalability, performance, and effectiveness of the CEGAR loop functionality 120 compared to other static analysis tools. Further, the analysis engine 102 includes features that reduce the number of cases in which the CEGAR loop functionality 120 terminates without providing a conclusive result (e.g., because the CEGAR loop functionality 120 is unable to discover new predicates or take other actions to refute an infeasible trace). Further, the analysis engine 102 includes features that reduce the number of reported false positive errors.

In summary, FIG. 2 shows a procedure 200 which sets forth the above system-level explanation in flowchart form. In block 202, the system 100 receives an input program to be analyzed. In block 204, the system 100 receives a property to be investigated, such as a safety-related property. In block 206, the system 100 produces an instrumented IR program using any technique, such as by first producing an IR program and then injecting property information into the IR program. In block 208, the system 100 uses the analysis engine 102 to determine whether the error states in the instrumented IR program are reachable. As stated, the analysis engine 102 uses the iterative CEGAR loop functionality 120 to reach this conclusion.

B. Overview of the Analysis Engine

Figure 3:
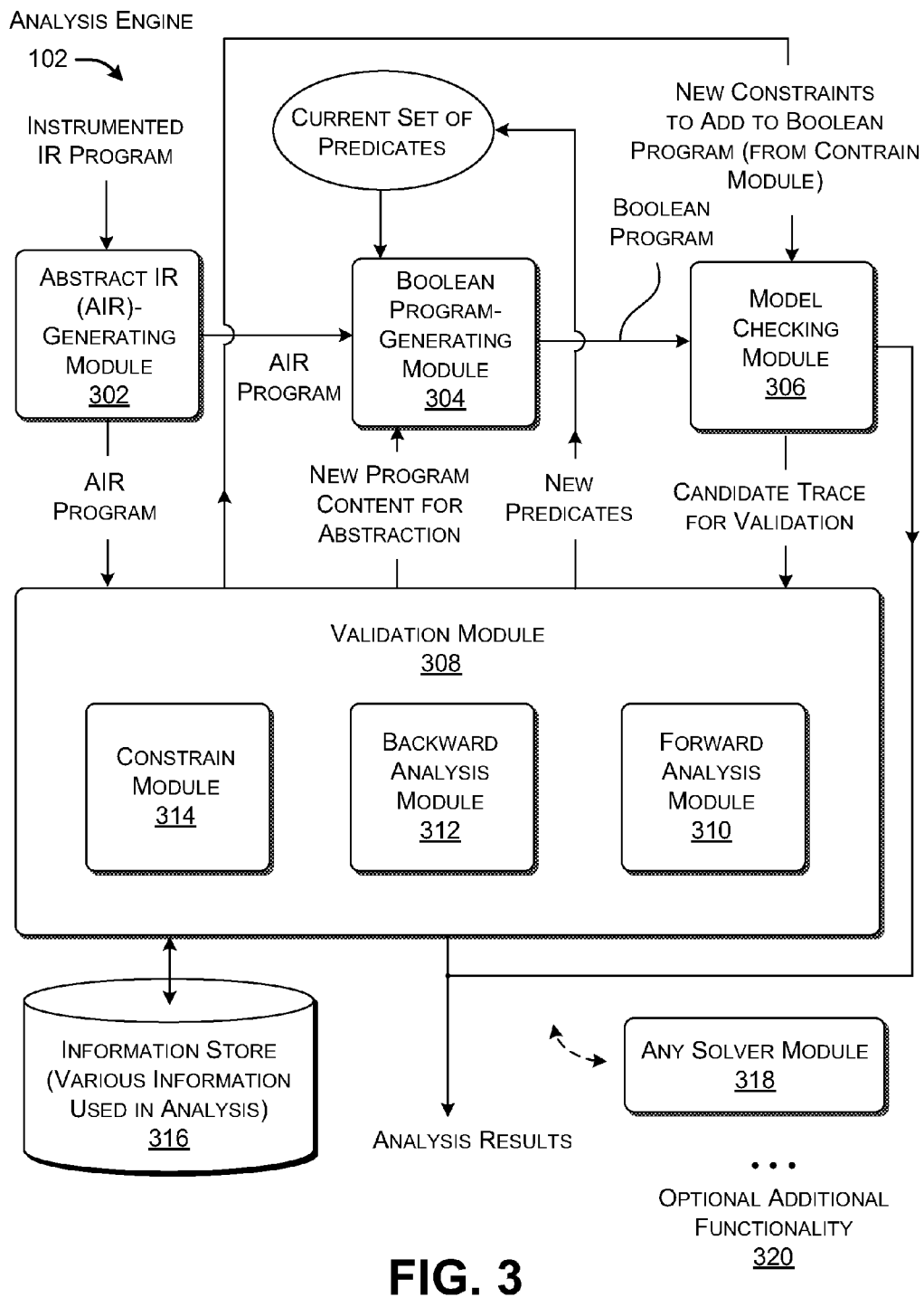
FIG. 3 shows an overview of the analysis engine of FIG. 1.

FIG. 3 shows an overview of the analysis engine 102, as introduced in FIG. 1. The analysis engine 102 includes (or can be conceptualized to include) multiple components that implement the CEGAR loop functionality 120 of FIG. 1. Later sections provide additional details regarding respective components shown in FIG. 3.

To begin with, the analysis engine 102 includes an abstract IR (AIR) generating module 302 ("AIR-generating module"). The AIR-generating module 302 receives the instrumented IR program described above. In response, the AIR-generating module 302 combines groups of statements in the instrumented IR program into respective blocks to produce an abstract IR program (an "AIR program"). Each block may include any number of statements, including a single statement or multiple statements. The remaining parts of the analysis engine 102 may therefore operate on the program in units of blocks, rather than individual statements.

The AIR-generating module 302 automatically selects the sizes of the blocks. As a general principle, the AIR-generating module 302 abstracts a group of statements into a block if the internal statements within the block are not individually germane to the property being investigated at a given time. Thus, the AIR-generating module 302 may attempt to create blocks that are as large as possible, but not so large as to obscure relevant detail in the instrumented IR program. Section C (below) will provide additional details regarding the operation of the AIR-generating module 302.

A Boolean program-generating module 304 performs abstraction on the AIR program (which incorporates the property information in the manner described above) with respect to a current set of predicates. The Boolean program-generating module 302 creates an abstraction of the AIR program in the form of a Boolean program. The Boolean program shares the same control flow as the AIR program. But the Boolean program includes only Boolean variables and presents a distillation of the original input program that narrowly focuses on the investigative target at hand. More specifically, each Boolean variable includes a first value which represents True and a second value which represents False. Each Boolean variable in a Boolean program has an interpretation as a predicate over variables of the input program. For example, consider the case in which the current set of predicates includes the predicate z>x. The Boolean program-generating module 304 may create a Boolean variable at some point in the Boolean program that represents this predicate; if this variable evaluates to True at that point, the implication is that the condition z>x holds true at the corresponding point in the AIR input program.

The Boolean program-generating module 304 performs the above type of transformation by processing each block of the AIR program as an integral whole. In doing so, the Boolean program-generating module 304 determines the manner in which each block affects the predicates. More specifically, the Boolean program-generating module 304 provides a Boolean transfer function (or "transformer") which represents the effects of a block on a predicate in the set the predicates.

Section D (below) provides additional information regarding the operation of the Boolean program-generating module 304. Background information regarding Boolean programs per se can also be found in the technical literature, such as: Ball, et al., "Checking Temporal Properties of Software with Boolean Programs," in *Proceedings of the Workshop on Advances in Verification*, July 2000; Ball, et al., Automatic Predicate Abstraction of C Programs," in *ACM SIGPLAN Notices*, Vol. 36, No. 5, 2001, pp. 203-213; Ball, et al., "Formalizing Counterexample-driven Refinement with Weakest Preconditions," in *Proceedings of the NATO Advanced Study Institute on Engineering Theories of Software Intensive Systems*, August 2004; Ball, et al., "Boolean and Cartesian Abstractions for Model Checking C Programs," in *Proceedings of the 7th International Conference on Tools and Algorithms for the Construction and Analysis of Systems*, 2001, pp. 268-283; and Ball, et al., "Boolean Programs: A Model and Process For Software Analysis," Microsoft Research Technical Report MSR-TR-2000-14, March 28, 2000.

A model checking module 306 analyzes the Boolean program created by the Boolean program-generating module 304. As summarized above, the model checking module 306 generally attempts to determine whether or not error states (associated with error labels) are reachable within the Boolean program. If the model checking module 306 can conclusively determine that it cannot reach an error, then it indicates that the input program is free from defects (with respect to the property being checked). The model checking module 306 may alternatively generate a candidate error trace, which may represent a feasible or infeasible path that leads to an error state.

The model checking module 306 can process the Boolean program using inter-procedural dataflow analysis. From a high-level perspective, the model checking module 306 operates by symbolically exploring different possible paths in the Boolean program, e.g., associated with the branches of conditional statements. Any state reachability analysis tool can be used to implement the model checking module 306, such as the "bebop" module provided by Microsoft Corporation of Redmond, Wash., as described, for instance, in: Ball, et al., "Bebop: A Symbolic Model Checker for Boolean Programs," in *Proceedings of the 7th International SPIN Workshop on SPIN Model Checking and Software Verification*, 2000, pp. 113-130.

A validation module 308 performs a number of functions. First, the validation module 308 operates on the candidate trace identified by the model checking module 306 to determine whether it is feasible or infeasible. The validation module 308 performs this task by operating on the AIR program itself, rather than the Boolean program. More specifically, the validation module 308 attempts to identify at least one point of inconsistency in the IR data computations along the candidate trace. If found, the validation module 308 pronounces the trace infeasible. Second, the validation module 308 attempts to determine actions that can be taken to refute an infeasible trace. The validation module 308 can accomplish this task in various ways, e.g., by discovering new predicates using various techniques, providing new statements to add to the AIR program, providing new constraints that affect the Boolean program, etc.

The CEGAR loop functionality 120 uses the new predicates (if discovered) to improve the precision at which the AIR program is abstracted, thus eliminating the spurious candidate trace in subsequent iterations of the CEGAR loop. The validation module 308 can also modify the AIR program by adding assumptions (in the form of assume statements). The assumptions pertain to values of variables at particular points in the AIR program. Like the predicates, the assumptions can eliminate the spurious trace in any new Boolean program that is produced based on the modified AIR program. Generally, the validation module 308 attempts to refute a spurious (infeasible) error trace in a minimal or manageable manner without too many new predicates or program modifications; this helps reduce the complexity of the resultant Boolean program and the processing performed thereon by the model checking module 306.

The validation module 308 uses a combination of forward analysis and backward analysis to analyze the candidate trace. A forward analysis module 310 performs the forward analysis and a backward analysis module 312 performs the backward analysis. Forward analysis refers to analysis performed on the steps in the candidate trace (with respect to the AIR program, not the Boolean program), advancing away from the initial state of the program. Backward analysis refers to analysis performed on the steps in the candidate trace, starting from the final state (an error state or an intermediate state) and advancing towards the initial state of the program. The term "steps" represents elements in the candidate trace, which in the case of the AIR program represent blocks of any size.

Section E provides details regarding the operation of the forward analysis module 310, and Section F provides details regarding the operation of the backward analysis module 312. By way of overview, the forward analysis module 310 collects various information about each step of the trace (such as parent procedure call, call stack level, etc.) and summary information about the trace. In some cases, the forward analysis module 310 can discover an inconsistency at some step on the trace. In response, it can perform a cut-the-tail processing (to be described below) to produce a subtrace for processing by the backward analysis module 312. Alternatively, the forward analysis module 310 can modify the AIR program by inserting additional assume statements into the AIR program, after which it can skip the backward analysis and start the next iteration of the CEGAR loop.

When (and if) called upon, the backward analysis module 312 uses the information provided by the forward analysis module 310 to continue validation of the trace and to discover new information for use in refuting the error trace, if the trace is found to be infeasible. As will be described, the backward analysis module 312 performs trace validation and predicate discovery using pointwise pre-condition computation. This process produces a "pyramid" data structure of aggregate state conditions, to be discussed below. This functionality yields predicates with increased relevancy (compared to other techniques, for example, forward trace validation), e.g., by more precisely determining the actual reason that accounts for the infeasibility of the trace. This aspect, in turn, reduces the total number of predicates used for abstraction and improves performance of the CEGAR loop as a whole.

The bidirectional approach to error trace validation confers various benefits. For example, the validation of long error traces represents a significant bottleneck within the CEGAR loop. This means that it is useful to commence analysis of the trace closer to a point of divergence (which is associated with incorrect branching in the control flow graph). This means that a one-directional approach to error validation will be inefficient for traces in which the point of divergence is located closer to the distal end of the trace, with respect to the point at which analysis commences. In contrast, the validation module 308 employs a bidirectional approach with lightweight forward analysis and thorough backward analysis (on an as-needed basis) supported by the forward analysis. This approach yields satisfactory performance regardless of the location of the point of divergence, including the case in which the point of divergence occurs close to the initial state of the trace, and the case in which the point of divergence occurs close to the final error state. Further, the computation of preconditions performed by the backward analysis module 312 is less expensive (from a computational point of view) compared to other techniques, such as the computation of post-conditions (performed in forward analysis). However, pre-condition computation can be computationally prohibitive as well. To at least partially ameliorate this issue, the backward analysis can leverage the preprocessing of the error trace in the forward direction, as performed by the forward analysis module 310.

A constrain module 314 generates new constraints to be added to the Boolean program in a next CEGAR iteration. A constraint refers to any information (besides new predicates or program statements) which limits the operation of the model checking module 306. One tool that can be used to implement the constrain module 314 is described in Ball, et al., "Refining Approximations in Software Predicate Abstraction," in *Proceedings of TACAS,* 2004, pp. 388-403. In the present context, the validation module 308 calls on the constrain module 314 when both the forward analysis module 310 and the backward analysis module 312 recognize the infeasibility of the trace but cannot prove it (by finding new predicates).

An information store 316 represents one or more repositories of information that pertains to the operation of the analysis engine 102, and, in particular, the operation of the validation module 308. For example, the information store 316 can store interim results provided by the forward analysis module 310 for use by the backward analysis module 312 and/or other components of the analysis engine 102.

Various components of the analysis engine may rely on a solver module, represented in FIG. 3 as "any solver module" 318. The solver module 318 attempts to solve an expression that is expressed in the symbolic domain, e.g., providing an indication whether the expression represents a contradiction or not, etc. Any solver module can be used in conjunction with the analysis engine 102, such as the well-known Z3 solver module provided by Microsoft Corporation of Redmond, Wash., and as described in: Leonardo de Moura, et al., "Z3: An Efficient SMT Solver," in *Tools and Algorithms for the Construction and Analysis of Systems*, Vol. 4963/2008, Apr. 3, 2008, pp. 337-340. Another solver module is described in Ball, et al., "Zapato: Automatic Theorem Proving for Predicate Abstraction Refinement," in *Lecture Notes in Computer Science*, No. 3114, pp. 457-461.

The notation "optional additional functionality" 320 indicates that the analysis engine 102 can include additional features and components (not particularly enumerated in FIG. 3). For example, the analysis engine 102 can include a pointer analysis component (not shown). The pointer analysis component performs analysis of pointers in the input program to determine the aliasing relations between program variables. Two or more separate variables are considered aliased if they refer to the same storage location in memory. For example, if pointers p and q are used to refer to the same memory location X, p and q are said to be aliased.

The pointer analysis component can first perform alias analysis on the original IR program (not yet instrumented with the property information). The pointer analysis component can then repeat this analysis for the instrumented IR program. The pointer analysis component can store the results of its analysis in the information store 316 (or some other repository). In the course of the analysis performed by the CEGAR loop, various components can pose aliasing queries to the information store 316, e.g., asking whether particular pointers p and q may be aliased. In this context, the information store 316 can maintain aliasing relations for the program as a whole; these relations constitute global aliasing relations.

Other pointer analysis functionality (e.g., as implemented by the validation module 308) can also generate and store aliasing relations that pertain to a particular execution trace in the program. That is, this aliasing information pertains to the individual trace and is therefore local with respect to the trace, rather than the program as a whole. Local pointer analysis is precise, unlike global pointer analysis. For instance, in some cases, global pointer analysis may indicate that pointers p and q could be aliased, but the local pointer analysis may indicate that these pointers are not aliased with respect to a particular trace (but that these pointers are aliased with respect to some other trace). As described below, the local pointer analysis functionality can perform local pointer analysis in the course of processing a trace in a particular iteration of the CEGAR loop.

As a final point, FIG. 3 was described in the context of an integrated combination of different functional pieces. That integrated combination possesses distinct utility when viewed as a synergistic whole. But individual pieces of the analysis engine 102 also have independent utility in their own right, such as, but not limited to, the AIR-generated module 302, the forward analysis module 310, the backward analysis module 312, and the validation module 308 as a whole, as well as other functional pieces and methodologies described herein. This means that these components can be employed in other types of analysis tools to confer various benefits. To cite one example, the backward analysis module 312 has utility in any engine without the use of the AIR-generating module 302, and vice versa.

Figure 4:
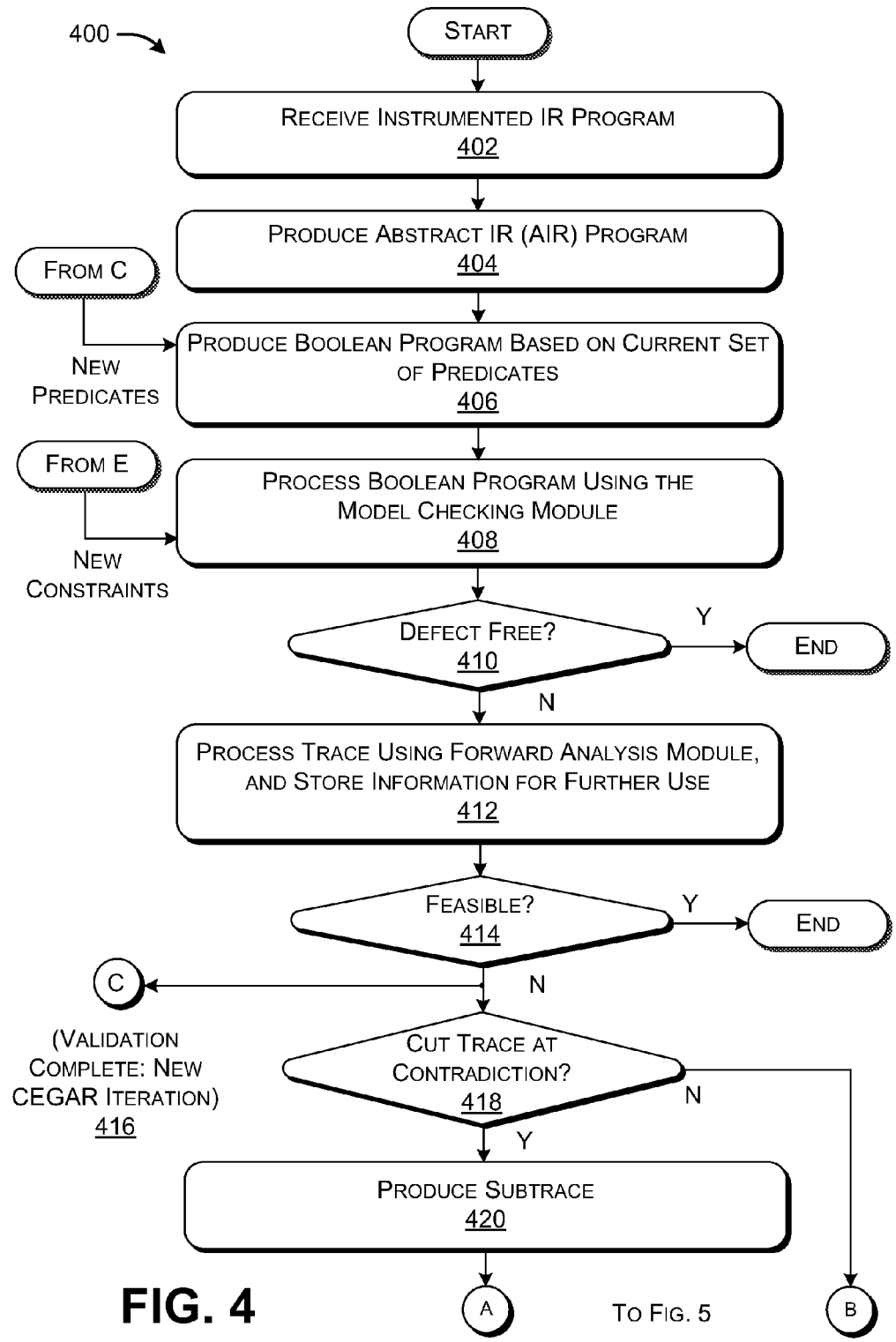
FIGS. 4-6 together provide a flowchart which describes one manner of operation of the analysis engine of FIG. 3.
Figure 5:
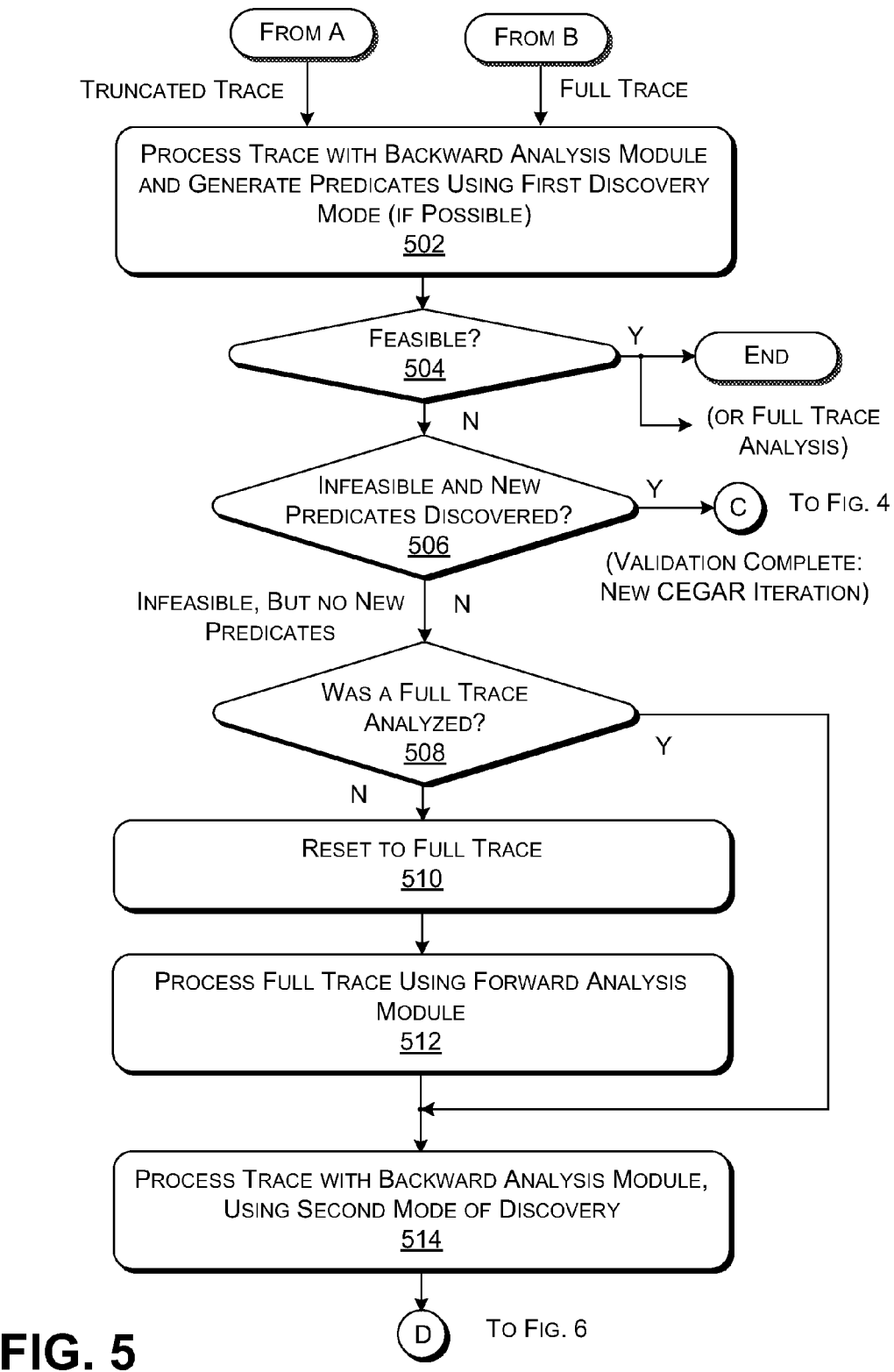
Figure 6:
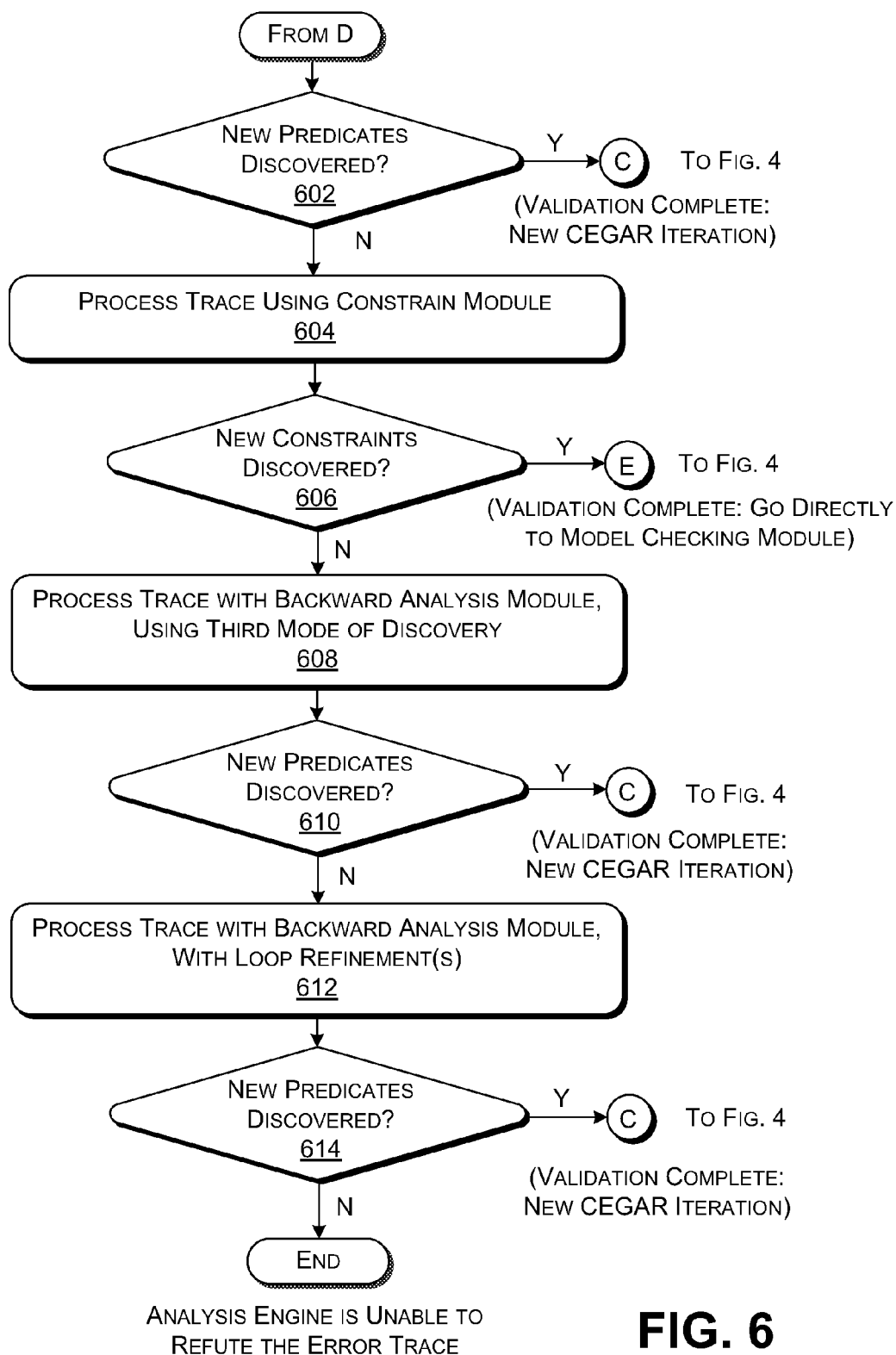

FIGS. 4-6 together represent a procedure 400 that explains one manner of operation of the analysis engine 102 depicted in FIG. 3. From a high-level perspective, in the procedure 400, the analysis engine 102 provides a suite of different analysis techniques for analyzing and refuting a candidate trace. The different analysis techniques may incur different respective levels of computational complexity and associated computational "expense." In one mode of operation, the analysis engine 102 attempts to process the error trace using the least expensive technique first. If this technique fails to yield desired results, the analysis engine 102 can apply the next technique in the sequence of increasingly aggressive techniques. The procedure 400 also allows the analysis engine 102 to generate predicates in a more precise and accurate manner compared to other approaches. As stated above, the goal is not simply to identify relevant predicates, but to provide a manageable set of relevant predicates that allows the CEGAR loop to continue in an efficient manner.

By way of overview, the illustrative procedure 400 in FIGS. 4-6 identifies, among other operations, three different modes of predicate discovery: a first mode; a second mode; and a third mode. The second mode offers a greater refinement compared to the first mode, and the third mode offers a greater refinement compared to the second mode. These operations, invoked on an as-needed basis, represent just one implementation of the principles described herein. Other implementations can make use of other types of techniques. Further, other implementations can combine different techniques together in different ways (e.g., using different rules) compared to the particular example set forth in FIGS. 4-6. For example, other implementations need not order their techniques on the basis of computational "aggressiveness"; for instance, other implementations can just provide N different techniques performed in any order. Further, other implementations can make use of different numbers of techniques compared to the particular example set forth in FIGS. 4-6 (e.g., by using fewer than three predicate discovery modes, or more than three predicate discovery modes, etc.). Further, other implementations can attempt to perform two or more techniques in parallel, rather than in series. More generally stated, the analysis engine 102 can be built using an extensible approach that can accommodate full flexibility in combining different techniques together.

In block 402, the analysis engine 102 receives the instrumented IR program as an input. Optionally, the analysis engine 102 may also identify an initial set of predicates; but in other cases, the analysis engine 102 can begin with an empty set of predicates.

In block 404, the AIR-generating module 302 produces the AIR program by grouping the statements in the instrumented IR program into respective blocks in an adjustable manner.

In block 406, the Boolean program-generating module 304 generates the Boolean program based on the AIR program and current set of predicates.

In block 408, the model checking module 306 processes the Boolean program to determine whether it is possible to reach any of the error states in the program.

In block 410, the model checking module 306 determines, on the basis of its processing, whether the Boolean program is free of defects, and, by implication, whether the input program is free of defects (with respect to the property under investigation). If so, the analysis engine 102 terminates and reports that outcome.

Presume that the model checking module 306 identifies a candidate trace that leads to an error state. If so, in block 412, the forward analysis module 310 commences validation on the candidate trace. For example, the forward analysis module 310 processes the candidate trace in the forward direction in an attempt to determine whether the trace is feasible or infeasible. In the course of its processing, the forward analysis module 310 also stores various information items regarding the candidate trace.

In block 414, the forward analysis module 310 determines whether the candidate trace is a feasible trace. This conclusion can be reached in limited cases, e.g., in which feasibility can be assessed without performing the more detailed backwards analysis. If such a case exists, the analysis engine 102 terminates its processing with a conclusion that the input program contains an actual error.

The forward analysis module 310 can alternatively detect that the trace includes a contradiction. This means that the trace is unfeasible. The forward analysis module 310 can reach this conclusion, for example, if it encounters a dereference of a pointer p that has NULL value. At this point, the analysis engine 102 has several options.

In action 416, the forward analysis module 310 can possibly discover one or more predicates associated with the contradiction. For example, in the above example (in which the dereference of the pointer p has a NULL value), the forward analysis module 310 can identify the predicate (p!=0). The analysis engine 102 can then refine its abstraction of the AIR program based on the updated set of predicates. Alternatively, or in addition, the forward analysis module 310 can provide one or more new program statements with the goal of eliminating the contradiction upon re-abstraction. In these cases, the validation module 308 can optionally entirely bypass the backward analysis by immediately returning to block 406.

Alternatively, in blocks 418 and 420, the forward analysis module 310 can truncate the candidate trace such that it terminates at the point of contradiction that has been discovered in the trace. In other words, the forward analysis module 310 can discard the steps in the trace "below" the point of contradiction. The forward analysis module 310 can then pass the subtrace to the backward analysis module 312 for further processing.

Still alternatively, the forward analysis module 310 can advance to the backward analysis module 312 without cutting the trace, that is, by offering the full trace to the backward analysis module 312 for analysis.

Advancing to FIG. 5, in block 502, the backward analysis module 312 processes the candidate trace (e.g., either the subtrace or the full trace) using backward analysis using a first mode of predicate discovery (to be described below). This processing involves the construction of a pyramid data structure of aggregate conditions (to be described below).

In block 504, the backward analysis module 312 determines whether it is possible to conclude that the trace is feasible. In that case, the analysis engine 102 terminates its processing and reports its outcome. (However, as indicated in FIG. 5, if the backward analysis module 312 has reached its feasibility conclusion with respect to analysis performed on a subtrace, the validation module 308 may perform additional analysis on the full trace before reaching a final conclusion as to feasibility.)

Presume that the trace, on the contrary, proves to be infeasible because it contains a contradiction. In this case, in block 506, the backward analysis module 312 determines whether it is possible to determine predicates associated with the detected contradiction in the trace (using the first mode of predicate discovery). This processing involves analyzing the pyramid data structure. At this phase in the process, the backward analysis module 312 examines a single column of the pyramid data structure in an attempt to discover new predicates (where this column is associated with the detected contradiction). In the event that the backward analysis module 312 discovers at least one new predicate, the analysis engine 102 returns to block 406; at this juncture, the Boolean program-generating module 304 generates a refined abstraction of the AIR program based on the updated set of predicates.

Presume that block 506 is answered in the negative, meaning that no predicates are discovered in the above-summarized first mode of predicate discovery. Then, in block 508, the backward analysis module 312 determines whether it has just processed a subtrace or the full candidate trace. If the former case is true, in block 510, the backward analysis module 312 restores the full trace for analysis.

In block 512, the forward analysis module 310 performs the above-summarized forward analysis on the full trace (whereas it may have previously truncated its analysis upon discovering a contradiction in the trace).

In block 514, the backward analysis module 312 then repeats it own analysis of the full trace, using the information collected in block 512. The analysis engine 102 also directly invokes block 514 if it has previously processed the full trace (in block 502) without discovering a predicate. The backward analysis in block 514 differs from the backward analysis performed in block 502 because it employs a second mode of predicate discovery. In this mode, the backward analysis module 312 examines multiple columns in the pyramid data structure (to be described in greater detail below).

Advancing to FIG. 6, in block 602, the backward analysis module 312 determines whether it is now possible to determine predicates using the second mode of predicate discovery. In the event that the backward analysis module 312 discovers at least one new predicate, the analysis engine 102 returns to block 406; at this juncture, the Boolean program-generating module 304 generates a refined abstraction of the AIR program based on the updated set of predicates.

Presume that block 602 is answered in the negative, meaning that no new predicates can be discovered in the above-summarized second mode of predicate discovery. Then, in block 604, control passes to the constrain module 314. The constrain module 314 examines the candidate trace in an attempt to discover new constraints that can be applied to the Boolean program.

In block 606, the analysis engine 102 asks whether the constrain module 314 has identified any new constraints. If so, the analysis engine 102 commences a next iteration of the CEGAR loop, but this time starting with the model checking module 306 (in block 408). This processing reflects the fact that the validation module 308 has failed to discover any new predicates, but the constrain module instead has discovered new constraints. Thus, the analysis engine 102 can directly apply the constraints to the existing Boolean program, without generating a refined abstraction. The new constraints influence the operation of the model checking module 306.

In block 608, presume that even the constrain module 314 fails to discover new information to warrant commencing another iteration of the CEGAR loop. In this case, in block 608, the backward analysis module 312 is again called on to perform backward predicate discovery, but this time with a third mode of predicate discovery. This mode of predicate discovery is similar to the previous analysis; but in this case, the backward analysis module 312 continues its analysis of the candidate trace beyond the point where a contradiction occurs in the trace (as previously identified by the backward analysis module 312). That is, the backward analysis module 312 continues it processing of the candidate trace until new predicates are found, or the analysis reaches the initial state of the program. Section F provides additional details regarding all modes of predicate discovery.

In block 610, the backward analysis module 312 determines whether it is now possible to determine predicates using the more refined mode of predicate discovery. In the event that the backward analysis module 312 discovers at least one new predicate, the analysis engine 102 returns to block 406.

Presume that block 610 is answered in the negative, meaning that no predicates can be discovered in the above-summarized refined mode of predicate discovery. Then, in block 612, the analysis engine 102 runs the backward analysis module 312 with loop refinement (to be described below in Subsection G.3).

In block 614, the backward analysis module 312 determines whether it is now possible to determine predicates as a result of the loop refinements. In the event that the backward analysis module 312 discovers at least one new predicate, the analysis engine 102 returns to block 406.

If block 614 is answered in the negative, this means that the analysis engine 102 has entirely failed to discover information to warrant another iteration of the CEGAR loop. At this juncture, the analysis engine 102 terminates without providing a successful outcome. That is, the analysis engine 102 concludes that it can neither prove nor disprove that the safety property holds for the input program.

C. Abstract IR (AIR) Generating Module

This section provides additional details regarding one manner of operation of the AIR-generating module 302. To repeat, the AIR-generating module 302 combines statements in the instrumented IR program to create plural blocks. Each block may include any number of statements.

In a first example, the AIR-generating module 302 produces a basic block abstraction. A basic block abstraction includes a sequence of (non-branching) assignment and/or assume statements that ends with either a conditional statement or a procedure call (or return) statement. (Assignment and assume statements are described below.) A basic block has a single outgoing edge.

In a second example, the AIR-generating module 302 produces a superblock. A superblock includes any sequence of statements that has a single incoming edge (entry point) but possibly multiple outgoing edges (exit points).

In a third example, the AIR-generating module 302 performs procedure-level abstraction. In this case, the AIR-generating module 302 abstracts an entire procedure, which is treated as a single statement in the AIR program.

The AIR-generating module 302 can produce yet other blocks having of other granularities.

As a general guiding principle, the AIR-generating module 302 determines that it is possible to add statements to a block so long as a transformer can be computed for each outgoing edge of the block. In this context, a transformer represents a function on a set of predicates that maps the value of each predicate at the incoming edge of the block into its value at the outgoing edge. In one implementation, the AIR-generating module 302 attempts to create a most efficient block for a particular circumstance, e.g., by exploring the possibility of creating a superblock before it creates a basic block.

Figure 7:
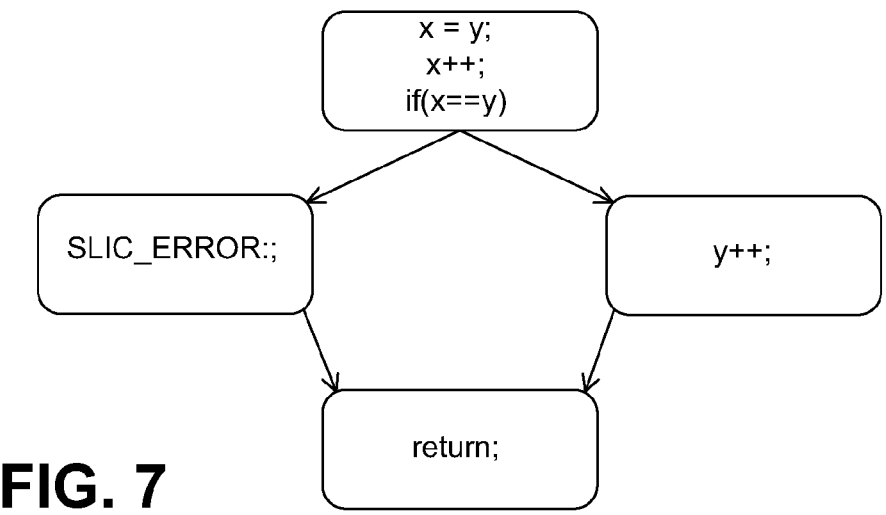
FIG. 7 shows a graphical depiction of part of an input program.
Figure 8:
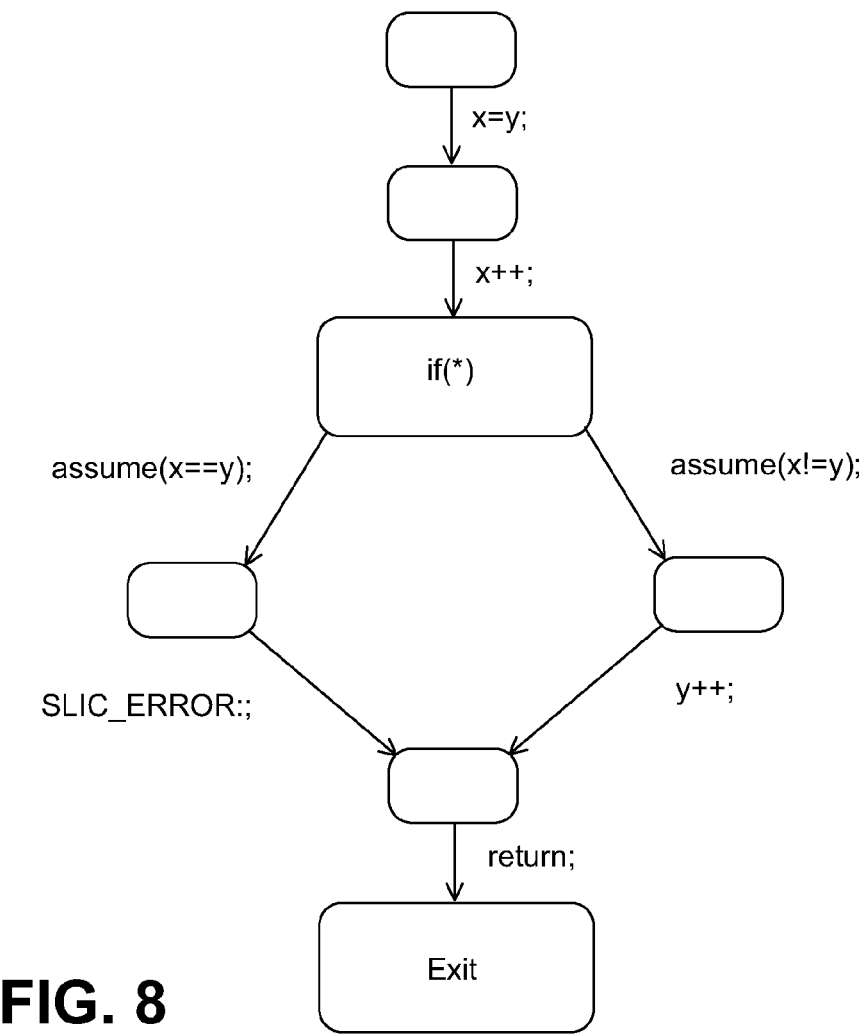
FIG. 8 shows a transformation of the input program of FIG. 7; here, each element of the transformation is devoted to a single statement of the input program.

FIG. 7 shows an example of an input program and FIG. 8 shows a single-statement IR representation of the input program. That is, note that each edge of the IR program in FIG.

Figure 9:
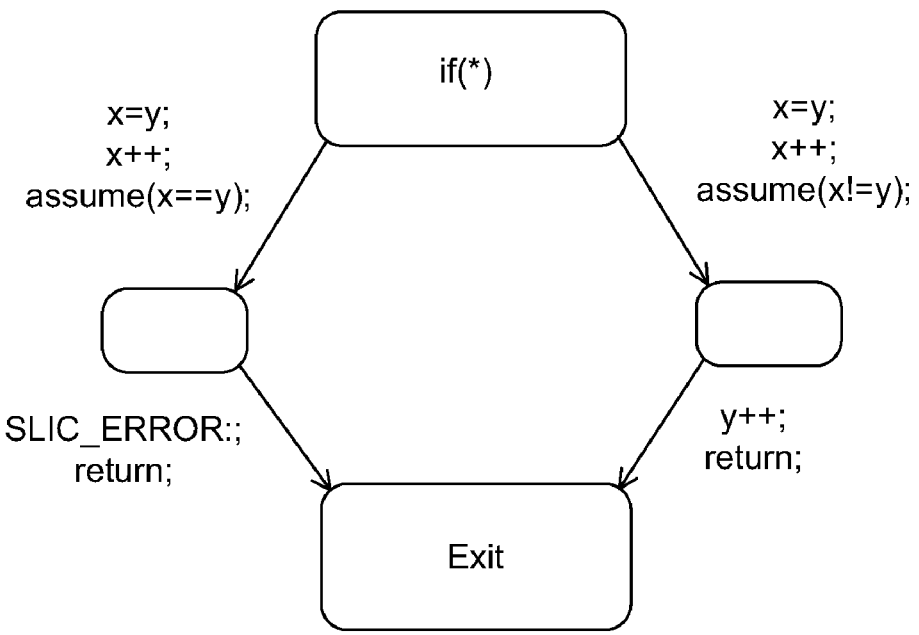
FIG. 9 shows another transformation of the input program of FIG. 7, where each element of the transformation includes multiple statements of the input program; that is, this figure illustrates the output of an abstract IR (AIR) generating module provided by the analysis engine of FIG. 3.

8 represents a single statement. In contrast, FIG. 9 shows an example of an AIR program produced by the AIR-generating module 302. The AIR-generating module 302 performs basic block abstraction to produce plural blocks of statements. That is, in FIG. 9, each edge of the AIR program represents a basic block of statements.

The Boolean program-generating module 304 receives the AIR program represented in FIG. 9 as an input. The Boolean program-generating module 304 performs abstraction on each block of statements as a unit, instead of each statement in isolation. In other words, the Boolean program-generating module 304 represents each block with a corresponding transformer, which allows the Boolean program-generating module 304 to build an abstraction of the block. The Boolean program-generating module 304 is not "aware" of the particular statements that comprise the block. In one case, the Boolean program-generating module 304 translates a multi-statement block into a single parallel multi-variable assignment.

The use of the AIR-generating module 302 confers several benefits. First, the AIR-generating module 302 simplifies and expedites the processing performed by other components of the analysis engine 102. This is because the analysis engine 102 can now process a "smaller" program which presumably involves fewer state transitions (for example, fewer steps in the candidate trace). The performance of a model checking module (to be described below) may be particularly enhanced through the use of the AIR-generating module 302; the CEGAR loop as a whole thereby benefits because this component often acts as a bottleneck within the CEGAR loop. Second, the analysis engine 102 is implemented such that it can maintain an agnostic approach in regards to the internal contents of each block; that is, the components of the analysis engine 102 perform the same type of processing regardless of whether a block represents a single statement or multiple statements. Further, the components within the analysis engine 102 treat assignment and assume statements in a uniform manner. These aspects further simplify the analysis engine 102 as a whole, e.g., by avoiding the need for different processing functionality which addresses different block-size granularities or other particular aspects of the AIR program.

Figure 10:
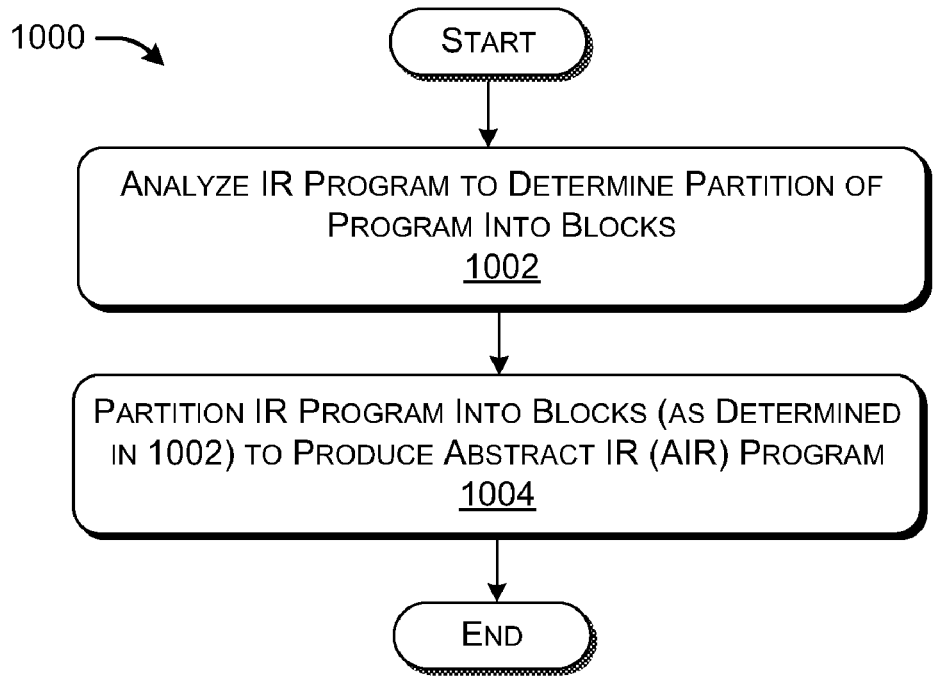
FIG. 10 is a flowchart that describes one manner of operation of the AIR-generating module of FIG. 3.

FIG. 10 shows a procedure 1000 which summarizes the above explanation in flowchart form. In block 1002, the AIR-generating module 302 analyzes the instrumented IR program to determine how it can partition the statements contained therein into blocks. In block 1004, the AIR-generating module 302 produces the AIR program containing the blocks identified in block 1002.

D. Boolean Program-Generating Module

As summarized above, the Boolean program-generating module 304 performs abstraction on the basis of the AIR program to produce a Boolean program. More specifically, the Boolean program-generating module 304 receives three pieces of input information. First, the Boolean program-generating module 304 receives the AIR program. Second, the Boolean program-generating module 304 receives a current set of predicates. That is, the Boolean program-generating module 304 can initially receive an empty set of predicates or an ad hoc set of selected predicates or some other initial set of predicates. Third, the Boolean program-generating module 304 receives a list of procedures to be re-abstracted. For example, the validation module 308 can sometimes add new statements to the AIR program. In addition, or alternatively, the validation module 308 can make a decision to concretize a previously abstract procedure, and so on. The Boolean program-generation module 304 responds in these situations by re-abstracting the identified procedures, e.g., to render them concrete.

The abstraction of the AIR program is performed by computing the effect of each block in the AIR program as an update on the values of Boolean variables (predicates) of the Boolean program. This abstraction is generally imprecise, resulting in a Boolean program that can potentially yield spurious traces (that do not represent actual traces in the input program). The imprecision of Boolean abstraction ensues from various factors, such as the potential incompleteness of the set of Boolean predicates used in a particular iteration of the CEGAR loop, as well as the nature of the algorithms that perform the abstraction operation.

Consider first, for purposes of a structured explanation, the application of the Boolean program-generating module 304 to individual statements in an IR program. In one approach, the Boolean program-generating module 304 uses the weakest liberal pre-condition to compute the effect of a statement s on a Boolean program, with respect to predicate p. In general, the weakest pre-condition WP(s, p) of post-condition p with respect to statement s is the weakest predicate p' whose truth before s entails the truth of p after s terminates (if it terminates). For example, let D represent a set of predicates $\{x==0, x>2\}$, where x is a variable in the IR program. Further, let a and b correspond to the predicates x==0 and x>2, respectively. The Boolean program-generating module 304 can approximate the expression x==1 as schoose(F, a||b), and the Boolean program-generating module 304 can approximate the assignment x=1 as the parallel assignment a, b:=F, F, which assigns F (False) to both predicates a and b. This is because WP(x=1, $\{x==0\}$)=F and WP(x=1, $\{x>2\}$)=F.

The function schoose expresses unconstrained (or non-deterministic) behavior. That is, an expression schoose($e_1, e_2$) returns True if expression $e_1$ returns True, and False if expression $e_2$ returns True, and otherwise returns a non-deterministic choice between True and False. Another function that represents non-deterministic behavior is a non-deterministic goto statement that includes a list of labels that the program control flow can change to. Non-deterministic choice (of a label in case of goto statement or a Boolean value in case of schoose statement) forces the model checking module 306 to independently explore each alternative of the choice.

Figures 11, 12:
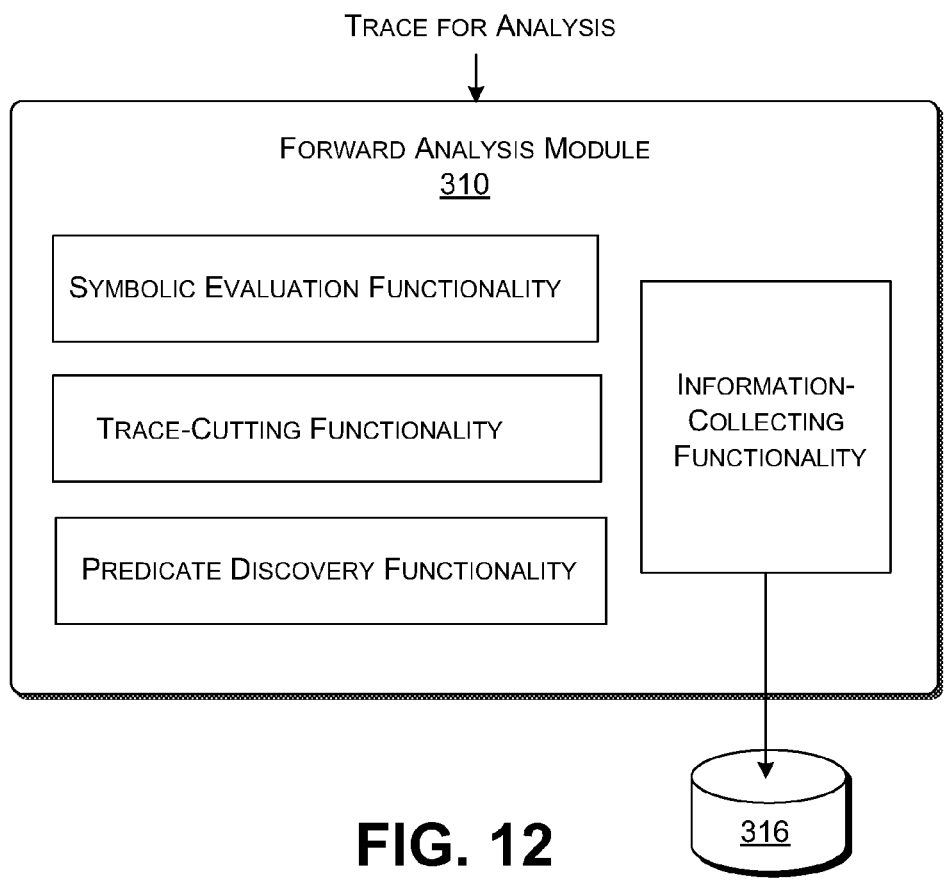
FIG. 11 is a program excerpt that illustrates the output of a Boolean program-generating module provided by the analysis engine of FIG. 3.
FIG. 12 shows a more detailed view of a forward analysis module provided by the analysis engine of FIG. 3.

With that introduction, FIG. 11 shows an illustrative result produced by the Boolean program-generating module 304 when applied to a block of statements at the level of basic block abstraction. Namely, in one implementation, the Boolean program-generating module 304 can abstract each basic block into a Guarded Parallel Assignment (GPA) in the Boolean program. GPA provides a uniform way to abstract both assignments and assume statements of the input program. (Note that an assignment statement assigns a value to a variable. An Assume(e) statement terminates the program execution if the predicate e evaluates to False. A parallel assignment statement simultaneously assigns plural values to a set of variables.) More specifically, the Boolean program-generating module 304 represents assume statements by attaching constraints to the parallel assignment; a constraint restricts the transition relation of an assignment, thus effectively acting as an assume statement.

In the example of FIG. 11, the Boolean program-generating module 304 assigns a corresponding constraint to the assignment for each branch of the if statement. Although the predicate $\{x==y\}$, represented by the Boolean variable $b_0$, is assigned a non-deterministic value by the assignment $b_0$:=schoose( ), attached constraints determine the correct value of the predicate for each branch of the if statement. The model checking module 306 uses the constraints in the Boolean program to limit the transition relation, which, in turn, limits the set of possible traces in the program. Note that that the functionality set forth with respect to FIG. 11 is optional; that is, the analysis engine 102 can employ a different way of constructing a Boolean program.

E. Forward Analysis Module

FIG. 12 shows a more detailed view of the forward analysis module 310. The forward analysis module 310 can include (or can be conceptualized to include) a collection of interrelated functionality, including: symbolic evaluation functionality; predicate discovery functionality; trace-cutting functionality; and information-collecting functionality. This functionality is described below.

E.1. Symbolic Evaluation and Discovery of Contradictions

In general, the forward analysis module 310 performs symbolic evaluation of the statements along a path in the AIR program, starting from the path's first statement at the entry of a main procedure. Note that the AIR program encapsulates initialization statements within initialization procedures, where the initialization procedures are called from the main procedure. Thus, the forward analysis module 310 processes these initialization statements before any actual statement in the main procedure body.

Symbolic evaluation of an assignment statement involves: (i) R-evaluating a RHS (right-hand-side) expression; (i) L-evaluating a LHS (left-hand-side) expression; and (iii) storing the symbolic value obtained in operation (i) in the symbolic location obtained in operation (ii).

R-evaluation of an expression involves: (i) replacing variables by their symbolic values (which may be stored earlier); (ii) R-evaluating the expression's operands; and, finally, (iii) applying the expression's operator to symbolic values of the operands. A symbolic value of a constant corresponds to the constant itself. If variable x does not have a previously-stored symbolic value, the forward analysis module 310 introduces a fresh symbolic value, which corresponds to this variable itself; technically, this value is marked with an appropriate tag, for example, Undefined(x).

L-evaluation of an expression is defined as follows. A symbolic location of a simple variable x or a field access via a simple variable, e.g., x.f, or an array element access via a simple variable and an index expression that evaluates to a constant, e.g., x[2], corresponds to this expression itself, that is, respectively, x, x.f and x[2].

In any of the above three cases, a pointer dereference *p can also be used instead of a simple variable x. Pointer variable p has a symbolic value which is either the address of some variable, e.g., y, or Undefined(q). In the former case, *p is replaced with y, thus reducing this case to the example presented above. In the latter case, the forward analysis module 310 introduces a new variable, e.g., z; the forward analysis module 310 then stores the address of z as the new symbolic value of p (the address of z is also stored as the symbolic value for any other pointer variable that currently has symbolic value Undefined(q)). Then, the forward analysis module 310 replaces *p with z, again reducing this case to the example presented above.

With the above introduction, now consider the application of the forward analysis module 310 to a candidate trace that comprises a sequence of steps. Each step corresponds to a block associated with one of the input program procedures, or an entry (or return) edge into (or from) a procedure, or an exit from the main procedure. The forward analysis module 310 attempts to determine whether the trace contains a contradiction. If so, the forward analysis module 310 identifies the trace as infeasible.

Consider, for example, a step K that corresponds to a block having one or more assume statements (e.g., as illustrated in FIG. 9). The symbolic evaluation of the conditions in these assume statements produces a set of Boolean expressions. Let $C_1, \ldots C_n$ represent these conditions. The forward analysis module 310 may consult the solver module 318 to determine whether the conjunction of conditions $C_1 \&\& \ldots C_n$ can be satisfied. If not, the forward analysis module 310 has discovered a contradiction at step K.

The above conclusion can be generalized as follows. Let $A_1, \ldots A_m$ represent all conditions collected from all assume statements from all blocks that the trace passes, from the first step up to the current step (which hence encompasses conditions $C_1, \ldots C_n$ from the current step, as described above). If the solver module 318 can conclude that the conjunction $A_1 \&\& \ldots A_n$ is not satisfiable, this means that the forward analysis module 310 has discovered that the given step is infeasible.

Upon encountering an inconsistency, the predicate discovery functionality of the forward analysis module 310 may attempt to discover new predicates (if possible) within the context of the forward analysis. If found, the forward analysis module 310 can then start another iteration of the CEGAR loop, bypassing the backward analysis in its entirety. Alternatively, the forward analysis module 310 can start backward analysis with the objective of discovering additional new predicates; that is, the analysis engine 102 can call on the backward analysis module 312 to generate a more comprehensive set of new predicates so as to reduce the number of iterations of the CEGAR loop. If the forward analysis module 310 cannot discover any new predicates, then the forward analysis module 310 can advance directly to the backward analysis.

E.2. Trace-Cutting Procedure

Figure 13:
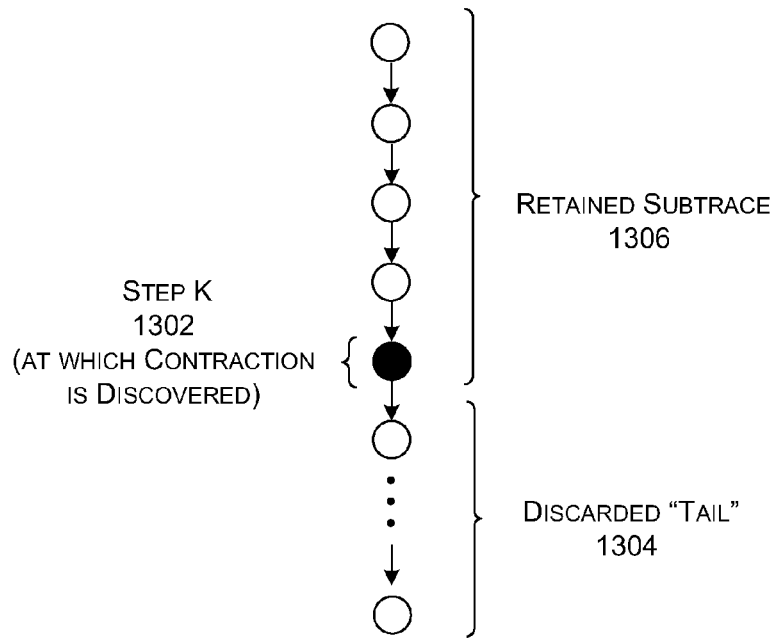
FIG. 13 shows an illustrative trace that can be processed by the forward analysis module of FIG. 3; more specifically, FIG. 13 demonstrates how the forward analysis module can form a subtrace upon detecting a contradiction in a full trace.

The forward analysis module 310 can also invoke trace-cutting functionality if the forward analysis module 310 discovers a contradiction in the trace. Referring to FIG. 13, assume that the forward analysis module 310 discovers that a contradiction occurs at step K 1302 in the trace. The forward analysis module 310 can discard the steps which follow step K 1302, namely the collection of steps 1304. This leaves a remaining subtrace 1306. The backward analysis module 312 can then process the subtrace 1306 as if it represented the full trace. Analysis of the subtrace 1306 (as opposed to the full trace) is appropriate because the infeasibility of the full trace in this situation can be proved by analyzing only the first K steps of the trace.

Figure 14:
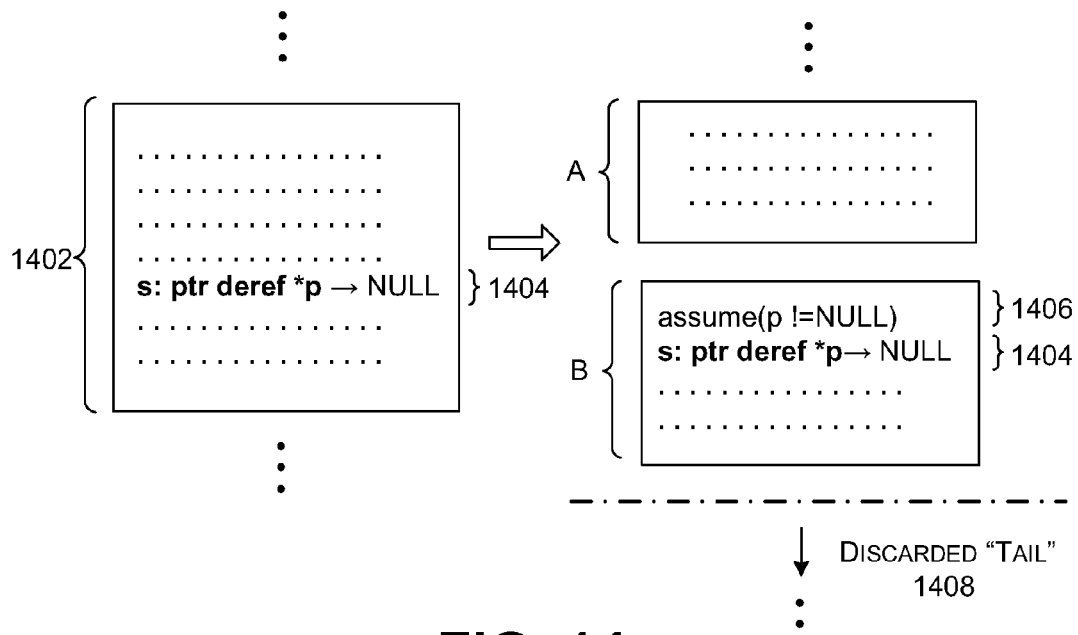
FIG. 14 shows a program excerpt that illustrates how the forward analysis module can partition a block upon encountering the use of a pointer that is NULL.

FIG. 14 shows another refinement that the forward analysis module 310 can perform. In particular, FIG. 14 shows how a NULL pointer dereference is handled by the forward analysis. For example, as shown there, a block 1402 has a statement s 1404 (e.g., an assume or assignment statement); the statement s, in turn, has a pointer dereference *p. Assume that the symbolic evaluation of pointer p at the statement s results in value NULL for pointer p. FIG. 14 represents this scenario using the abbreviated notion: "s: ptr deref *p→NULL." To address this situation, the forward analysis module 310 can split the current block 1402 into two blocks, block A and block B, such that the statement s 1404 starts the second block B. The forward analysis module 310 can then insert an Assume(p!=NULL) statement 1406 into the AIR program as a new first statement in block B before the statement s 1404. Note that this modification effectively changes the AIR program; it is equivalent to introducing a new error state into the program. The forward analysis module 310 can then remove the tail part 1408 of the trace after the block B. The forward analysis module 310 can then pass the resultant subtrace to the backward analysis module 312 for further processing.

Alternatively, the analysis engine 102 can immediately begin another iteration of the CEGAR loop by running the Boolean program-generating module 304 on the modified AIR program, since the forward analysis module 310 has already discovered an inconsistency on the trace along with a new predicate (i.e., p!=NULL). However, the operation of the Boolean program-generating module 304 and the model checking module 306 is computationally expensive; hence, the analysis engine 102 may opt to call the backward analysis module 312 (as described above) to process the subtrace. Once called, the backward analysis module 312 attempts to determine if there are more inconsistencies in the subtrace (besides the NULL pointer dereference that has already been found) in the portion of that trace above the NULL pointer dereference point.

Assume that the backward analysis module 312 identifies additional inconsistencies in the subtrace and discovers additional predicates. At this juncture, the CEGAR loop resumes. Due to the use of new predicates (and the addition of the new assume statement), the model checking module 306 will no longer discover the previously-encountered error trace.

In contrast, if the input program does indeed have a NULL pointer dereferencing bug, the analysis engine 102 can prove that the trace is feasible and report this fact to the user. Functionality is described in Subsection G.2 (below) which provides "on-the-fly" processing of new verification targets; this functionality can assist in the investigation of potential errors that have been encountered in the course of analysis, such as NULL pointer dereferencing bugs.

Finally, the forward analysis module 310 collects information over the course of the processing performed by the forward analysis module 310. The forward analysis module 310 can store the information in the information store 316.

E.3. Summary

Figure 15:
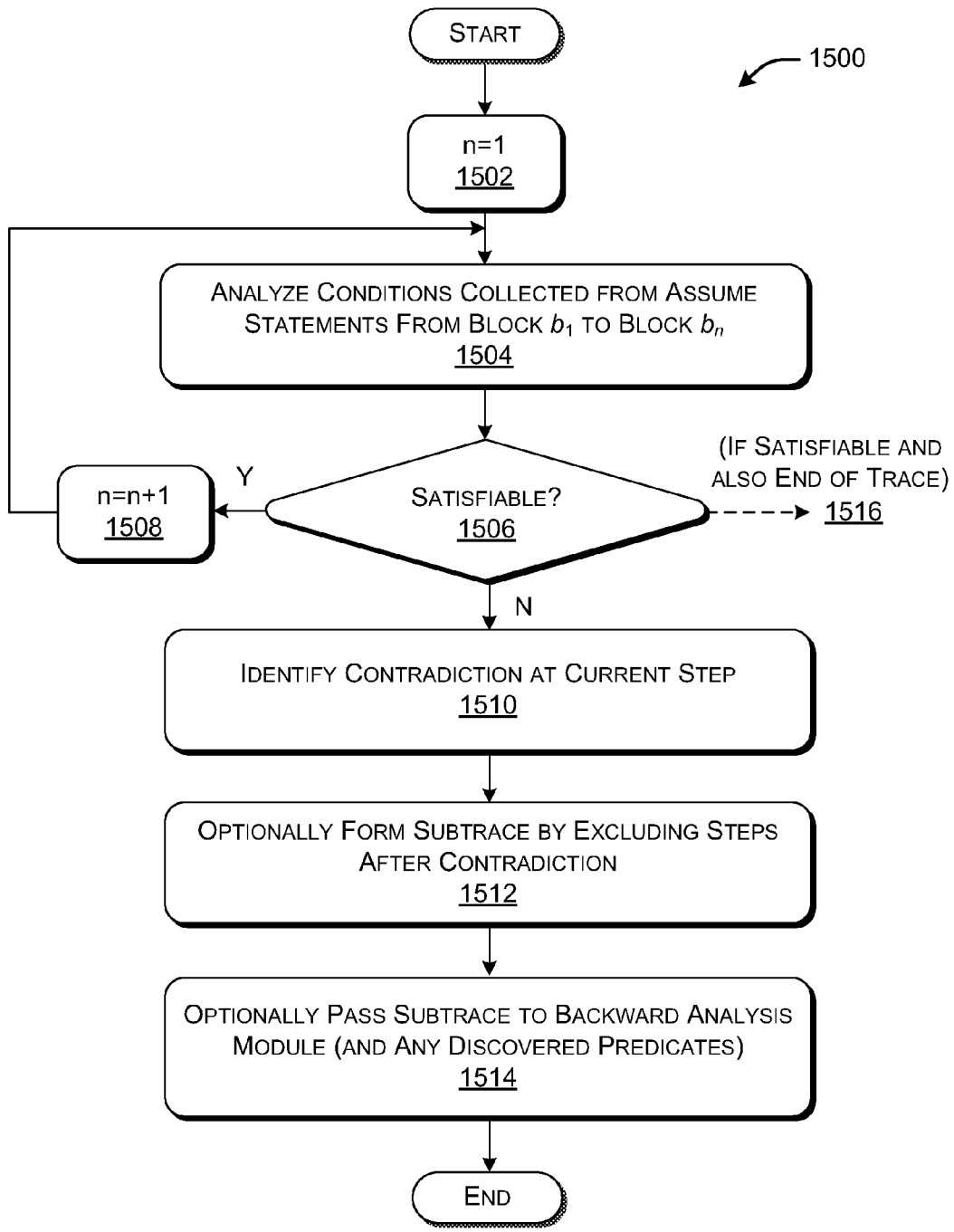
FIG. 15 is a flowchart that describes one manner of operation of the forward analysis module of FIG. 12.

FIG. 15 shows a procedure 1500 which summarizes aspects of the above explanation in flowchart form. In block 1504, the forward analysis module 310 analyzes conditions collected from assume statements from block $b_1$ to block $b_n$, where n is initially set to 1 in action 1502.

In block 1506, the forward analysis module 310 determines whether the conjunction of the conditions $(A_1, \ldots A_m)$ collected from all assume statements in blocks $b_1$-$b_n$ is satisfiable. The forward analysis module 310 can interact with the solver module 318 to make this decision. If the answer to the question is "yes," then the forward analysis module 310 advances to the next block (as per action 1508), upon which it repeats actions 1504 and 1506.

Presume that the answer to the question in block 1506 is "no." In this case, the forward analysis module 310 identifies a contradiction at the current step, i.e., n. The forward analysis module 310 can optionally also identify one or more new predicates in the forward analysis phase of processing (if this is possible).

In block 1512, the forward analysis module 310 optionally forms a subtrace by excluding steps below the point of contradiction.

In block 1514, the forward analysis module 310 can effectively pass the subtrace (or the full trace) to the backward analysis module 312 for further processing.

Although not identified in FIG. 15, the forward analysis module 310 collects information throughout the procedure 1500 and stores the information in the information store 316.

Action 1516 indicates that the forward analysis module 310 can possibly reach the end of the trace, upon which it performs appropriate processing. At this juncture, the forward analysis module 310 may not have identified a contradiction associated with a step within the trace, and therefore the trace is assessed as satisfiable; but the forward analysis module 310 has nonetheless stored potentially useful information which facilitates additional analysis, e.g., by the backward analysis module 312.

F. Backward Analysis Module

Figure 16:
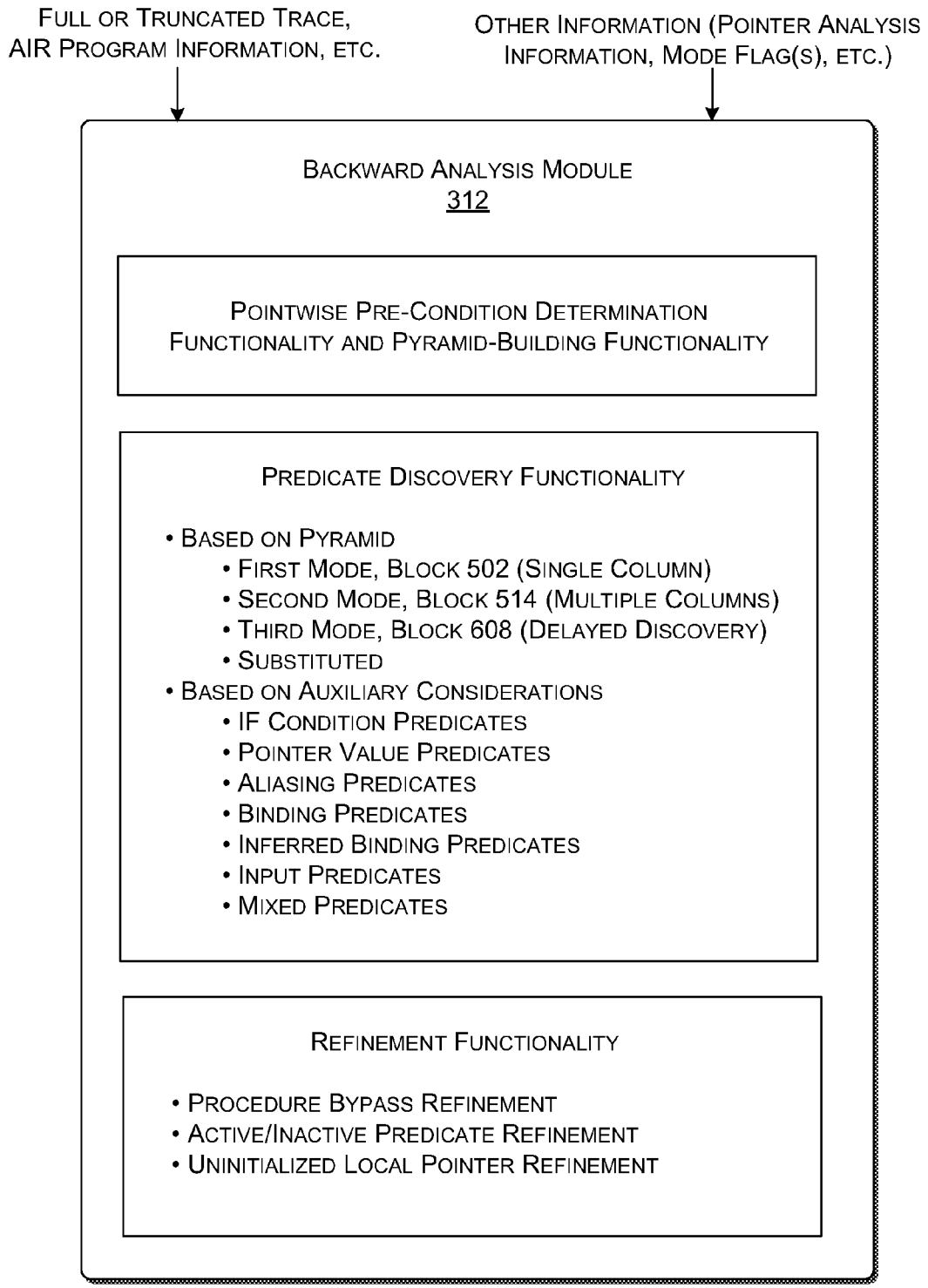
FIG. 16 shows a more detailed view of a backward analysis module provided by the analysis engine of FIG. 3.

FIG. 16 shows a more detailed view of the backward analysis module 312. The backward analysis module 312 can include (or can be conceptualized to include) a collection of interrelated functionality, including: pointwise pre-condition determination (PPD) functionality; predicate discovery functionality; and refinement functionality. This functionality is described below.

As to terminology, the explanation below refers to a program state as a map from program locations (variables) into their values. A condition corresponds to a set of states. For example, y>0 defines the set of all states in which y is greater than 0. The explanation refers to such a condition as a state condition. An error state refers to any state associated with the program state at an abort statement. $D_i$ refers to the set of predicates used for abstraction at a current iteration (i) of the CEGAR loop.

F.1. Generation of a Pyramid Data Structure

In general, the backward analysis module 312 receives either a full trace or a subtrace from the forward analysis module 310, as well as more general information regarding the AIR program. (The term "trace" will be used in a generic sense in this section, unless otherwise noted.) The backward analysis module 312 can also receive other information, e.g., originating from the forward analysis module 310 and other components of the analysis engine 102. For example, the backward analysis module 312 can receive pointer analysis information, flag(s) which control the mode of backward analysis to be performed, and so on.

The backward analysis module 312 analyzes the trace, commencing from either the error state in the program or from an interim step. The error state corresponds to the error label that the model checking module 306 found to be reachable in its analysis of the Boolean program. The interim step corresponds to a contradiction that the forward analysis module 310 discovered upon processing the trace in the forward direction. That is, if the forward analysis module 310 has performed the cut-the-tail processing, the interim step corresponds to a terminal step of the subtrace. In performing its analysis, the backward analysis module 312 operates on steps in the AIR program, rather than the Boolean program.

More specifically, the steps correspond to respective blocks of statements in the AIR program. However, to facilitate explanation, this section presents several examples in which the steps are said to correspond to individual statements. The principles set forth in the context of individual statements apply will equal force to block-level processing.

From the starting point in the trace, the backward analysis module 312 analyzes the trace in the backwards direction, e.g., moving from the terminal step in the trace towards the beginning of the trace. In doing so, the backward analysis module 312 attempts to determine, at each step, whether the trace contains a logical contradiction. If the backward analysis module 312 discovers no contradiction, then it concludes that the trace is feasible; otherwise, the backward analysis module 312 concludes that the trace is infeasible. In the latter case, the backward analysis module 312 attempts to discover new predicates to add to a new set of predicates $D_{i+1}$. The analysis engine 102 uses the new set of predicates to generate a refined Boolean program for the next CEGAR loop iteration, such that the previously encountered execution trace will not appear in the next CEGAR loop iteration.

More specifically, the backward analysis module 312 attempts to discover a logical contradiction by, at each step along the trace in the backward direction, calculating a set of states from which the program can reach the error state (at the abort statement). The backward analysis module 312 performs this task by computing a pre-condition which can be defined via the weakest liberal pre-condition, e.g., Pre(s, p)=!WP(s, !p). In this expression, "!" denotes logical negation, s refers to a statement, and p refers to a predicate. (To repeat, any feature described with reference to a statement is to be considered as applying with equal force to a block.)

More specifically, the backward analysis module 312 can represent the set of states at each step using a vector of state conditions, also referred to herein as a pointwise pre-condition. An aggregate state condition refers to the conjunction of these vector elements. As such, a one-element vector represents the initial state (e.g., the error state) at which the backward analysis module 312 begins its analysis; the aggregate state condition at this point is, trivially, True. For each subsequent step in the trace, the backward analysis module 312 processes the corresponding statement of the AIR program relative to the aggregate state condition for the immediately preceding step (further down on the trace); this allows the backward analysis module 312 to calculate a new pointwise pre-condition, and, hence, a new set of states.

In yet greater detail, for an Assume(e) statement in the trace (for example, corresponding to a conditional statement in the C program), the backward analysis module 312 adds a new state condition e to the current pointwise precondition as an additional conjunction member. The addition of this state condition effectively constrains the set of states that can lead to the error state. In contrast, for an assignment statement in the trace, the backward analysis module 312 just modifies the existing members of the pointwise pre-condition through predicate transformation based on the weakest pre-condition, as specified above; in other words, the backward analysis module 312 does not add new state conditions to the precondition.

For each new pointwise pre-condition, the backward analysis module 312 calls the solver module 318 to determine if the corresponding aggregate condition (conjunction), and hence, the set of states it represents, is satisfiable or unsatisfiable. Two outcomes are possible. First, assume that the solver module 318 determines that the aggregate condition is unsatisfiable. In this case, the backward analysis module 312 has effectively discovered a logical contradiction, and the current set of states cannot possibly lead to the error state. At this point, the predicate discovery functionality of the backward analysis module 312 commences its processing, as described below. Second, if the solver module 318 finds that the aggregate condition is satisfiable, the backward analysis module 312 continues with its validation processing, advancing to the next step farther up the trace. And if the backward analysis module 312 eventually reaches the entry state of the program, it terminates the error validation process by concluding that the trace is feasible.

Hence, the backward analysis module 312 effectively creates a data structure as its processes the trace in the backward direction. The data structure comprises a sequence of pointwise pre-conditions, or vectors, where each vector corresponds to a step in the trace. This sequence grows in the vertical dimension along the execution trace (in the backwards direction), starting from the one-element vector (True) at the error state. The backward analysis module 312 extends the data sequence by one more element for each assume statement that it encounters on the trace. Thus, this sequence of vectors has the shape of a pyramid. For ease of reference, the data structure is henceforth referred to as a pyramid of aggregate state conditions, or simply a pyramid data structure.

Figure 17:
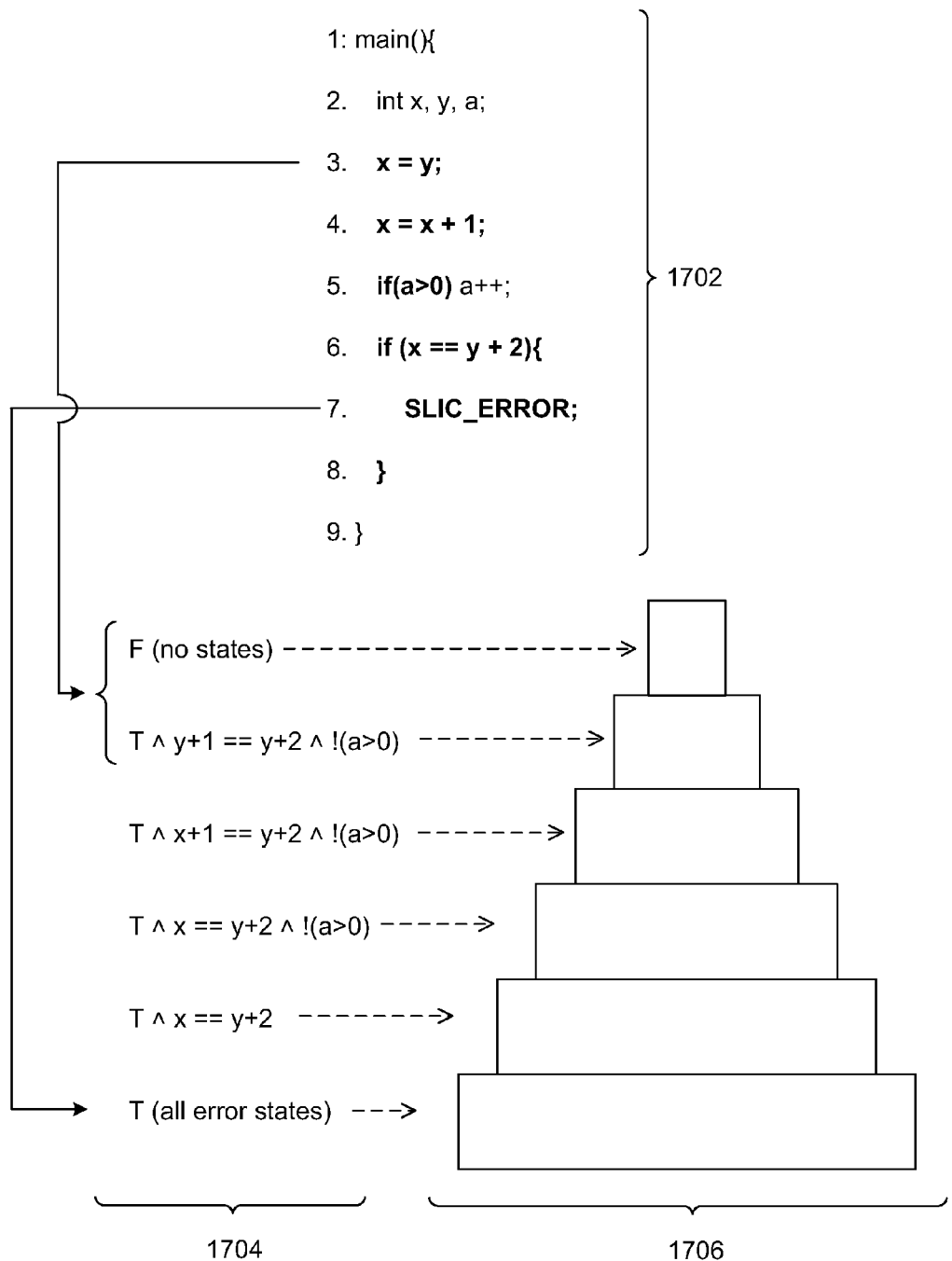
FIG. 17 shows a program excerpt and an accompanying pyramid data structure of aggregate conditions.

FIG. 17 illustrates the above concepts in graphical form. FIG. 17 first shows an illustrative program 1702. (Note that, although the backward analysis module 312 works in stepwise fashion on the AIR program, FIG. 17 illustrates the computations as if they were performed on the original input program for the sake of clarity.) The bolded statements within the program represent the error trace as reported by the model checking module 306. For example, based on line 5, it is evident that the conditional statement was executed, but "a++" was not, indicating that the condition (a>0) is false.

FIG. 17 includes a second column 1704 which shows symbolic calculations performed by the backward analysis module 312 for each step of the trace. That is, each line of the second column 1704 represents an aggregate state condition (conjunction), while the pointwise pre-condition consists of the members of the conjunction as a group. For example, the backward analysis module 312 represents the error state corresponding to line 7 in the program 1702 as T (True). As the backward analysis module 312 progresses from line 7 to line 6, the backward analysis module 312 adds the state condition (x==y+2) to the aggregate vector to restrict the set of states that can lead to the error state. After this modification, only states that satisfy the condition (x==y+2) can possibly lead to the error state. In line 5, the backward analysis module 312 adds the condition !(a>0). At line 4, using pre-condition calculations as described above, the backward analysis module 312 replaces all occurrences of x with (x+1). Then, the backward analysis module 312 replaces all occurrences of x with y (for line 3). At this point, the backward analysis module 312 observes that the only states that can lead to the error state are states that satisfy the state condition (y+1==y+2). This, of course, is an unsatisfiable requirement, and hence the backward analysis module 312 identifies the set of states as being empty. Hence, the backward analysis module 312 has discovered a logical contradiction on the trace at this point, and the trace is pronounced infeasible. At this point, the predicate discovery functionality of the backward analysis module 312 begins to discover predicates for the next iteration of the CEGAR loop.

A pictorial structure 1706 metaphorically represents the set of states at each step of the analysis. Note that the set of states is originally large at the beginning of analysis (at the error state), but progressively contracts as new constraints are added to the aggregate state condition. At the final step, a contradiction is discovered, meaning that the set of states is the empty set (represented by the pinnacle of the pyramid 1706).

F.2. Predicate Discovery

As to predicate discovery, the backward analysis module 312 operates in multiple phases, each subsequent phase being selectively invoked on an as-needed basis. For example, in block 502 of FIG. 5, the backward analysis module 312 performs predicate discovery using the first mode of discovery. In block 514 of FIG. 5, the backward analysis module 312 performs predicate discovery using the second mode of discovery. In block 608 of FIG. 6, the backward analysis module 312 performs predicate discovery using the third mode of discovery.

This section begins with an explanation of the first mode of predicate discovery, corresponding to block 502 in FIG. 5. FIG. 18 serves as a vehicle for explaining this mode of discovery. This figure shows a more explicit representation of the pyramid data structure introduced in FIG. 17. That is, in FIG. 18, each individual cell in the pyramid data structure stores a single state condition (also referred to as a predicate). Each row of the pyramid data structure represents a pointwise pre-condition and corresponds to a step in the error trace. New columns are added for the assume statements, for example, at step 5 (column 2) and step 6 (column 1).

Using the pyramid data structure, the backward analysis module 312 performs basic predicate discovery by selecting one of the columns that represents a source of the logical contradiction. The backward analysis module 312 then collects all the predicates in that respective column. For the example, in FIG. 18, column 1 results in the logical contradiction (at step 3). Hence, the backward analysis module 312 collects the predicates (y+1), (y+2), (x+1), (x==y+1), and (x==y+2). These predicates comprise new predicates that can be used to refine the abstraction of the AIR program in the next CEGAR iteration.

FIG. 19 shows a pyramid data structure that demonstrates the operation of the second mode of predicate discovery, corresponding to block 514 in FIG. 5. (The corresponding program code for this example is omitted for simplicity of presentation.) For this option, the backward analysis module 312 attempts to increase the number of discovered predicates by using all possible columns in the pyramid data structure that result in a contradiction. The backward analysis module 312 can rely on this option when multiple columns of the pyramid data structure result in a logical contradiction. For example, in FIG. 19, both columns 1 and 2 indicate the occurrence of a logical contradiction. Hence, the backward analysis module 312 collects predicates from both columns, instead of just one column as was the case for the scenario of FIG. 18. In the example shown in FIG. 19, both columns 1 and 2 terminate in False evaluations. But in other cases, a contradiction can arise from a relationship between particular columns, rather than from individual columns (considered in respective isolation). In such a case, predicates from all the columns that contribute to the contradiction can be collected.

In any mode of operation, the backward analysis module 312 can also attempt to find new predicates by performing substitution in the pyramid data structure with values of variables as stored by the forward analysis module 310. For example, assume that the forward analysis module 310 indicates that the value of variable a is −3 at some step in the trace. In response, the backward analysis module 312 can replace the predicate !(a>0) with False and a contradiction is found at that step. That is, the backward analysis module 312 replaces a with −3, which leads to False because −3>0 is not true. This results in discovery of the predicate !(a>0). In this mode of predicate discovery, the backward analysis module 312 can discover predicates earlier (e.g., closer to the error state), e.g., without the need to reach, in stepwise fashion, the actual step in the trace where variable a actually gets assigned the value −3 in the above example.

Figures 20, 21:
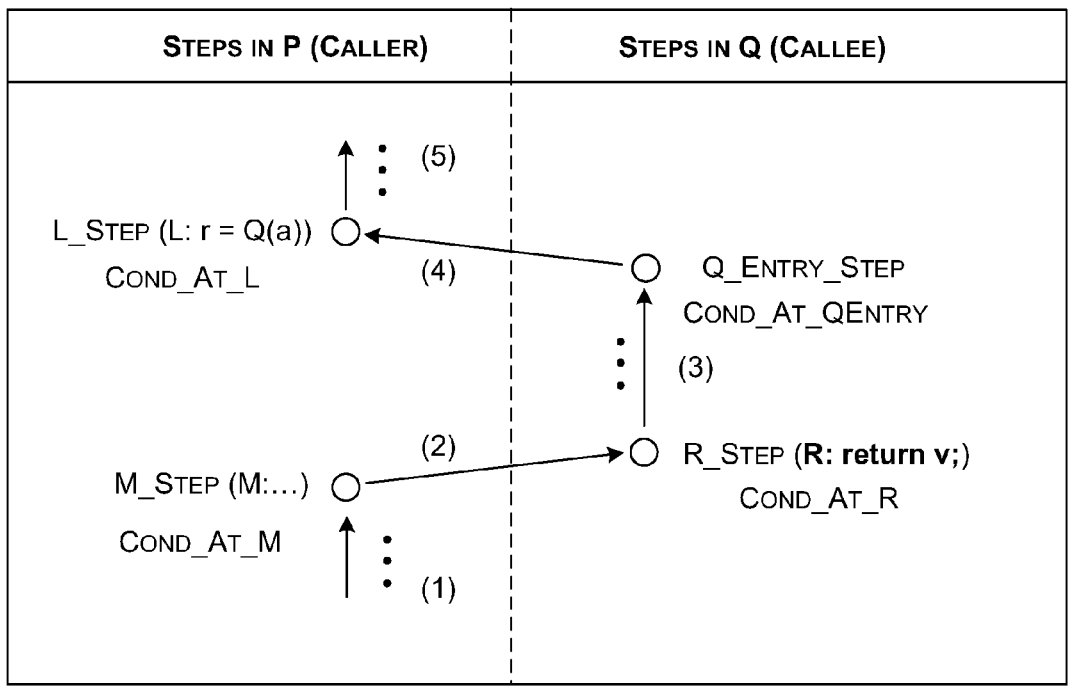
FIG. 20 shows another pyramid data structure, here illustrating the discovery of predicates using a third mode of discovery.
FIG. 21 shows a portion of a trace that includes a procedure call.

FIG. 20 shows a pyramid data structure that demonstrates the operation of the third mode of predicate discovery, corresponding to block 608 in FIG. 6. (Again, the corresponding program code for this example is omitted for simplicity of presentation.) For frame of reference, in the normal mode of predicate discovery (e.g., in the first mode), the backward analysis module 312 attempts to discover predicates at the earliest point of an observed logical contradiction (advancing backwards along the trace). However, the backward analysis module 312 may encounter a situation in which it repeatedly discovers the same predicates over subsequent iterations of the CEGAR loop. This could happen, for example, when the point of contradiction stays the same; hence, the backward analysis module 312 starts predicate discovery at the same step in the trace. In such a situation, the set of discovered predicates is not sufficient to refute the infeasible trace.

To make progress and discover new predicates in this case, the backward analysis module 312 continues its computations past the point of contradiction. At each step beyond a known contraction, the backward analysis module 312 excludes the previously-encountered contradiction from further computations. If the backward analysis module 312 discovers a new point of contradiction, it examines the column in which the new contradiction occurs to determine if it contains any new predicates. If so, the analysis engine 102 commences a next iteration of the CEGAR loop. Otherwise, the backward analysis module 312 proceeds to the next step of the trace, advancing in the above-described manner until it reaches the initial state. If the backward analysis module 312 reaches the initial state without finding any new predicates, the backward analysis module 312 reports that the trace is infeasible, yet no new predicates have been found.

In the example of FIG. 20, step 3 corresponds to the original point of contradiction, as indicated in column 1. In the manner described above, the backward analysis module 312 proceeds past step 3 (because the backward analysis module 312 cannot obtain satisfactory predicates from the "pre-contradiction" portions of the pyramid data structure), henceforth ignoring the previously-discovered predicate in column 1 (meaning that this predicate is not added to the conjunction that is supplied to the solver module 318 for processing). The backward analysis module 312 eventually discovers another contradiction in column 2 at step 1. As a result, the backward analysis module 312 finds the new predicate !(a>0), or, alternatively, (a>0).

F.3. Considerations Relating to Inter-Procedural Analysis

To facilitate discussion, the above explanation set forth the operation of the backward analysis module 312 in the context of program code containing assignment and assume statements. However, the AIR program may include procedure call statements and procedure return statements. The ensuing description will explain how the backward analysis module 312 can process an execution trace that contains these types of statements.

In the backwards trace evaluation, when the backward analysis module encounters a return statement from a procedure Q (callee) into a procedure P (caller), it converts predicates that comprise the aggregate condition computed in P at the step in the trace immediately after return from Q, into the Q's scope. It performs this task by using relations between actual parameters and the return value of P, on one hand, and formal parameters and the return variable of Q, on the other hand.

FIG. 21 graphically denotes processing performed on a program excerpt that includes a procedure call. Namely, a procedure P (caller) includes a statement (labeled as L) that includes a procedure call, e.g., L: r=Q(a). Assume that a statement (labeled as M) follows the call. The procedure Q (callee) includes a declaration int Q(f) { . . . R: return v;}. R refers to a label assigned to the return statement in procedure Q.

The backward analysis module 312 processes the statements in the program in the backward directions, according to the numbered sequence of operations (1), (2), (3), (4), and (5) (although the backward analysis module 312 may terminate its processing at any point along that path). At the step M_Step (that corresponds to the state labeled with M), the aggregate condition corresponds to the generically-labeled Cond_At_M (in P's scope). The backward analysis module 312 maps Cond_At_M into Cond_At_R (representing the condition at the R_Step in Q's scope) as follows: Cond_At_R=Cond_At_M[r/v, a/f]. This expression means that the backward analysis module 312 replaces all occurrences of the return value r and actual parameter a in Cond_At_M with the return variable v and formal parameter f, respectively. After that, the backward analysis module 312 continues computing the aggregate conditions within procedure Q (associated with path 3). Assume that, when the analysis within Q reaches Q's initial state Q_Entry_Step, the aggregate condition corresponds to the generically-labeled Cond_At_QEntry. The backward analysis module 312 then computes the condition at the L_Step (corresponding to the call statement) by performing the opposite conversion: Cond_At_L=Cond_At_QEntry[f/a, v/r].

FIG. 22 demonstrates the principles set forth above in the context of a pyramid data structure. The figure shows a program that has a procedure that includes a procedure call and a procedure return. The backward analysis module 312 maps the predicate x=y+2 at step 5 in the main procedure into the scope of the callee (the incr function). That is, the backward analysis module 312 replaces the return value x (from the main procedure) with the return variable w (from the incr procedure). At the call point (in step 2), the backward analysis module 312 performs the reverse mapping; as a result, (z+1=y+2) becomes (x+1=y+2). The analysis then continues as explained above. In this case, the backward analysis module 312 discovers a contradiction at step 0.

F.4. Auxiliary Predicate Discovery

In the above discussion, the backward analysis module 312 directly mines predicates from the pyramid data structure created by the backward analysis module 312. In addition, the backward analysis module 312 can discover predicates in other ways and from other sources. For example, the backward analysis module 312 can use data flow analysis on the trace or other techniques to discover additional predicates. Alternatively, or in addition, the backward analysis module 312 can infer additional predicates on the basis of information provided in the pyramid data structure. The predicates discovered through any of these supplemental techniques are referred to as auxiliary predicates herein. Technically, auxiliary predicates are related to the predicates included in the pyramid structure, and are implemented as their attributes.

Adding unnecessary predicates may lead to a larger Boolean program that may, in turn, slow down the operation of the model checking module 306. As a result, the backward analysis module 312 may sometimes refrain from adding auxiliary predicates to the set of discovered predicates in the iteration in which these predicates are discovered. Instead, the backward analysis module 312 can store some of the auxiliary predicates in the information store 316 as backup predicates, thus constituting a type of predicate database. The analysis engine 102 can call on these unused predicates on an as-needed basis at appropriate junctures of the CEGAR loop.

There are at least two classes of auxiliary predicates. A first class originates from considerations that do not pertain to inter-procedural analysis. A second class derives from inter-procedural analysis. In the following explanation, a set of new predicates (NP) refers to a group of predicates discovered during a current iteration of the CEGAR loop.

The first class includes the following illustrative auxiliary predicates.

(a) if Conditions. One or more predicates in the existing set of new predicates (NP) may be associated with blocks in the AIR program which include if statements. If so, the backward analysis module 312 can add new predicates which originate from the conditions of these if statements. There is one exception to this refinement. In the AIR program, the analysis engine 102 can express loops using conditional statements. The data flow analysis detects this feature and makes sure that identical predicates (based on if conditions) are not added to the current set of predicates. Subsection G.3 provides additional information regarding the use of conditional statements to represent loops.

(b) Pointer Values. For each pointer p from the predicates in the current set of new predicates (NP), the backward analysis module 312 adds the new predicate {p ==v}, where v is the pointer value, as determined by the forward analysis module 310. In one implementation, the backward analysis module 312 only resorts to this mode of predicate discovery when the current set of new predicates contains no new predicates, compared to information provided in the predicate database.

As stated above, the second class of predicates originates from considerations pertaining to inter-procedural analysis. For example, the relation between an actual parameter of a call of a procedure Q, and the corresponding formal variable, represents a predicate which, when used for abstracting the call of Q into the call of the corresponding Boolean procedure, would make the abstraction more precise (provided that the procedure call is relevant for the verification). Again suppose that the analysis engine 102 discovers a set of new predicates (NP) at a particular iteration of the CEGAR loop. Generally, the auxiliary predicates can be inferred from the predicates in NP by performing inter-procedural data flow analysis on the trace, for example, by analyzing how variables in the predicates from NP are related to other variables of the input program, both in the "lower" and "higher" parts of the error trace (with respect to the point of contradiction).

Auxiliary inter-procedural-type predicates for a predicate p from NP at a step K in the trace include the following illustrative predicates.

(c) Aliasing Predicates. Assume that step K represents a return step from a procedure Q. For each actual parameter a of Q, if an alias b of this actual parameter is present in the predicate p, then the backward analysis module 312 adds the predicate {a==b} as an aliasing predicate. In fact, the backward analysis module 312 performs this operation for each b aliased with a at step K. The reason why aliasing predicates are useful in improving the Boolean abstraction is set forth as follows. When converting predicates from the caller's scope into the callee's scope (Q) upon processing the return, b is replaced with the formal variable f of Q corresponding to a. Then, upon leaving Q's body and processing the call of Q, reverse conversion (from the callee's scope into the caller's scope) can be performed, this time replacing f with a, and not b, since at the call step, it is unknown whether b was the original variable that was converted into f (and not a). Therefore, to remember the aliasing relation between a and b, the backward analysis module 312 adds {a==b} as an auxiliary predicate.

(d) Binding Predicates. For each formal/return variable f in p, the backward analysis module 312 adds {f==a} as an auxiliary predicate. Here, a refers to the corresponding actual expression or the return variable of the caller at step K.

(e) Inferred Binding Predicates. These types of auxiliary predicates correspond to an expansion of the binding predicates on the procedure call stack, going backwards on the trace. Here, the backward analysis module 312 relates predicates from NP to the global variables (for example, for the language C, local variables of the main procedural are referred to as global variables). The backward analysis module 312 performs this task by building a chain of binding predicates, e.g., by generating inferred binding predicates for the current binding predicates at step K, e.g., by examining the caller of the caller of the current procedure, etc. This type of inference terminates at the main procedure.

(f) Input Predicates. For each global variable g in the inferred binding predicates, the backward analysis module 312 adds the auxiliary predicate {g==initg}, where initg corresponds to the initial value of g. The initial values of global variables are referred to as inputs.

(g) Mixed Predicates as Formal/return Predicates for Procedure Abstraction. Mixed predicates refer to those predicates that store the calling context of a procedure, and are used as additional formal or return predicates for the procedure abstraction. In most input languages, such as C, variables that are in the scope of a procedure Q include local variables of Q and global variables.

To illustrate this type of auxiliary predicate, again consider the example presented in FIG. 21. While converting an aggregate condition to/from the callee Q upon return/call, it is possible to encounter a predicate in Q that contains local variables of Q's callers that are not actual parameters of the call. These predicates are referred to as mixed predicates herein. Technically, mixed predicates relate variables from different scopes and do not represent valid expressions in the input language. In the present implementation, these types of predicates play a role in building a Boolean abstraction of Q; that is, the analysis engine 102 uses the predicates as formal or return predicates of a Boolean procedure QBool that represents the abstraction of Q. This is appropriate, since local variables of the caller can be considered as additional parameters of the callee; hence, predicates that contain them improve the precision of the abstraction.

Consider the following example which demonstrates how mixed predicates may appear. Assume that procedure P has two local variables, x and y, and a call of procedure Q, as represented by void P( ) {int x, y; L: Q(x); M: ... }, and void Q(f) {...}. Suppose that, at the step on the trace corresponding to label M in P (in FIG. 21), immediately after the return from Q, the aggregate condition is Cond_At_M={x==y}. At the next step, the backward analysis module 312 coverts the predicate {x==y} into the scope of Q, upon which it becomes {f==y}, after replacing the actual parameter x with f. This predicate {f==y} is a mixed predicate in Q because it includes a local variable y of the caller P, which is out of scope in Q. In fact, y can be thought of an additional formal parameter of Q that reflects the effect of the specific calling context of Q from P. If the predicate {f==y} is discovered as a new predicate for abstraction refinement (in NP), it will be used as a formal parameter of the Boolean procedure that corresponds to the abstraction of Q.

F.5. Illustrative Refinements

The backward analysis module 312 can employ various refinements to improve its performance. The following explanation identifies illustrative such refinements.

Active/Inactive Predicate Refinement. In the backwards trace evaluation, when the backward analysis module 312 encounters a return statement from procedure Q (callee) into procedure P (caller) at step K, it could happen that a conjunction member p that is a part of the aggregate condition at the return point (in P's scope) is not affected by Q (including procedures that are called from Q). This means that such a predicate p is inactive in Q. Otherwise, p is active in Q. For a predicate p to be inactive in Q, the following conditions apply: (1) for any variable v in p, v does not belong to the set of modifiable variables of Q; and (2) for any variable v in p, v is neither the return value of the call of Q nor an alias of the return value.

According to this refinement, if a predicate p is inactive in Q, the backward analysis module 312 does not convert p into Q's scope, and does not include p in the aggregate condition for satisfiablity check inside Q. Further, the backward analysis module 312 does not include p in the set of discovered predicates at the steps that are included within Q (where p is inactive).

FIG. 23 illustrates this type of refinement in the context of a pyramid data structure, corresponding to the program excerpt presented in the left column of that figure. As shown there, this refinement results in certain columns of predicates in the pyramid data structure becoming inactive for the duration of the analysis of the callee. For example, predicate a>0 in column 2 becomes inactive at step 4 while processing the return from the incr procedure. This predicate remains inactive until the path of the trace comes back into the caller P at step 2. The backward analysis module 312 will hence mark column 2 as inactive when analyzing the procedure incr. The backward analysis module 312 will mark it as active again after processing the corresponding call.

Procedure Bypass Refinement. In the backwards trace evaluation, when the backward analysis module 312 encounters a return statement from procedure Q (callee) into procedure P (caller) at step K, it could happen that Q, as well as all the procedures that are called from Q, do not affect the evaluation of conditions with respect to the aggregate condition at step K. In that case, the backward analysis module 312 can bypass the procedure Q in its entirety. The backward analysis module 312 can restart the evaluation at the step preceding the call of Q.

For a procedure to be bypassed, the following conditions apply: (1) all the conjunction members in the aggregate condition at the return step K are inactive in Q; (2) for all if and assume conditions e in Q, e does not control whether or not the entire program terminates; and (3) only procedures that have matching call and return statements in the error trace can be bypassed. For example, a procedure that has an abort statement cannot be bypassed. Further, a procedure that calls another procedure that has an abort statement cannot be bypassed.

Uninitialized Local Pointer Refinement. While validating an error trace, if the backward analysis module 312 reaches a step at the initial state of the procedure body, it could happen that there are some local pointers present in the aggregate condition at this step (wherein the condition is satisfiable). That means that those pointers have not been initialized in the procedure body. According to one implementation, a memory model is presumed in which different uninitialized pointers have different values (addresses). To ensure that this assumption holds at the initial state in the procedure body, the backward analysis module 312 (or some other component in the analysis engine 102) can add a clarifying statement at the beginning of the procedure. Namely, the backward analysis module 312 can add the following assumption (or distinctness condition) expressed as an assume statement, with respect to two pointers p and q: Assume(p!=q||((p==NULL) && (q==NULL))).

The backward analysis module 312 then proceeds with the validation of the trace. At the next iteration of the CEGAR loop (if any), the Boolean program-generating module 304 will re-abstract the procedure with the new distinctness condition. The new Boolean program created thereby will account for the local pointer distinctness. In this manner, the analysis engine 102 achieves refinement due to the additional constraints placed on the Boolean program. This provides a smaller state space for the model checking module 306 to explore.

F.6. Summary

Figure 24:
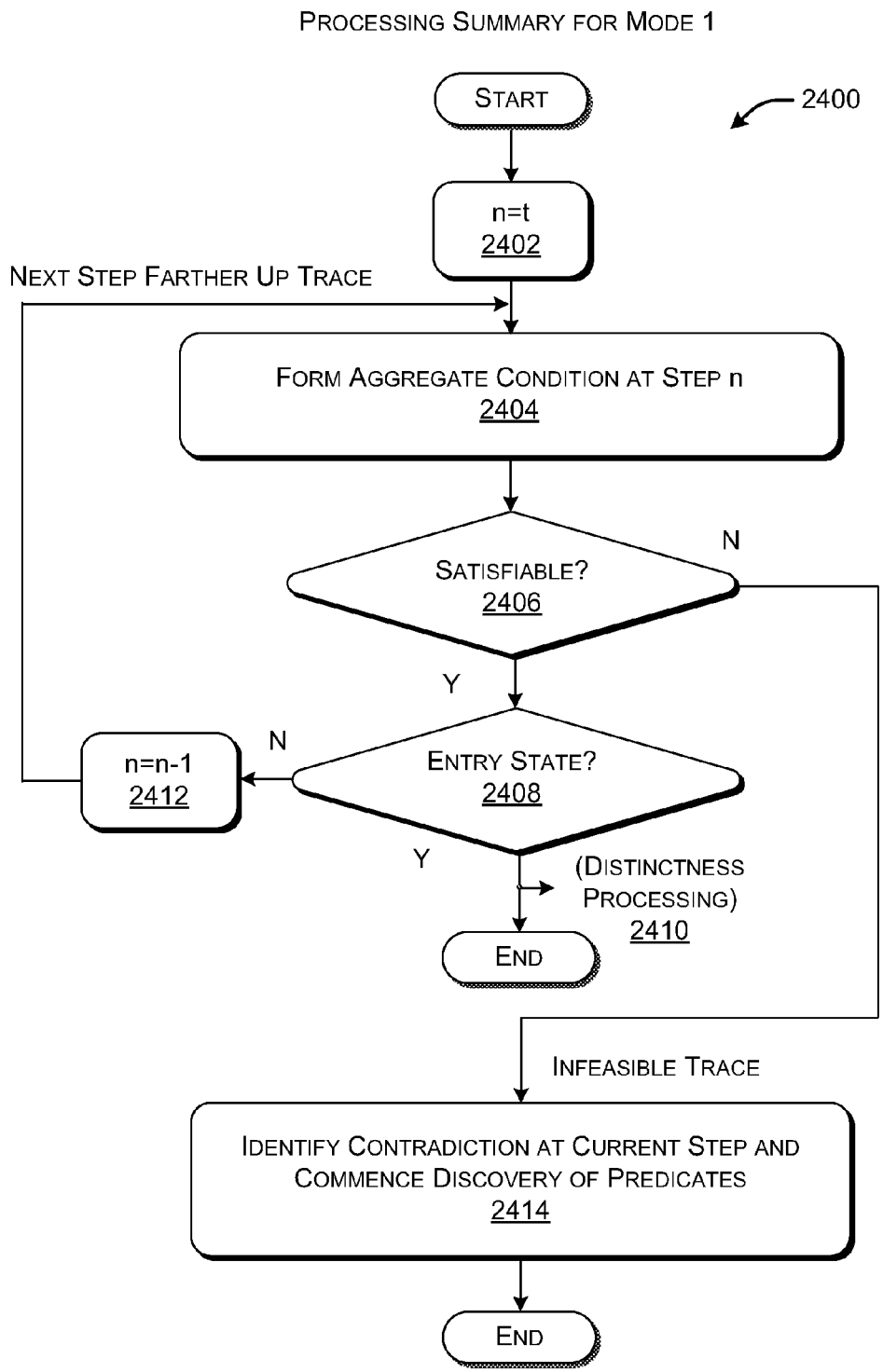
FIG. 24 is a flowchart that shows one manner of operation of the backward analysis module of FIG. 16.

FIG. 24 shows a procedure 2400 that illustrates some of the principles described above in flowchart form. More specifically, this figure summarizes the principles in the context of the first mode of predicate discovery (associated with block 502 of FIG. 5).

In block 2404, the backward analysis module 312 forms the aggregate condition at step n of the trace, initially representing some terminal step t in the trace (as specified in action 2402). The terminal step may correspond to an error state identified by the model checking module 306 or a point of contradiction identified by the forward analysis module 310.

In block 2406, the backward analysis module 312 determines whether the aggregate condition is satisfiable. The backward analysis module 312 can make this determination with the assistance of the solver module 318.

If block 2406 is answered in the affirmative (meaning that no contradiction is present), then block 2408 queries whether the backward analysis module 312 has advanced to the entry state of the trace. If so, then the analysis engine 102 pronounces the trace as being feasible. Before making this conclusion, the analysis engine 102 can perform processing to assess local and global pointer distinctness, as per action 2410. The analysis engine 102 may deem it appropriate to investigate distinctness in the manner described above (e.g., by adding an assume statement to the beginning of an appropriate procedure).

If block 2408 is answered in the negative (meaning that the entry state has not been reached), then the backward analysis module 312 advances to the next step of the trace (moving in the backward direction), as per action 2412.

If block 2406 is answered in the negative, this means that there is a contraction at the current step. In block 2414, the backward analysis module 312 then proceeds to discover predicates using the first mode of predicate discovery.

The procedure 2400 described above can be extended for other modes of predicate discovery. For example, in the third mode, the backward analysis module 312 can extend processing beyond a point of contradiction in the manner described above.

G. Miscellaneous Features

This section describes miscellaneous features that the analysis engine 102 can adopt to improve its performance.

G.1. Iterative Concretizing of Procedures

Figure 25:
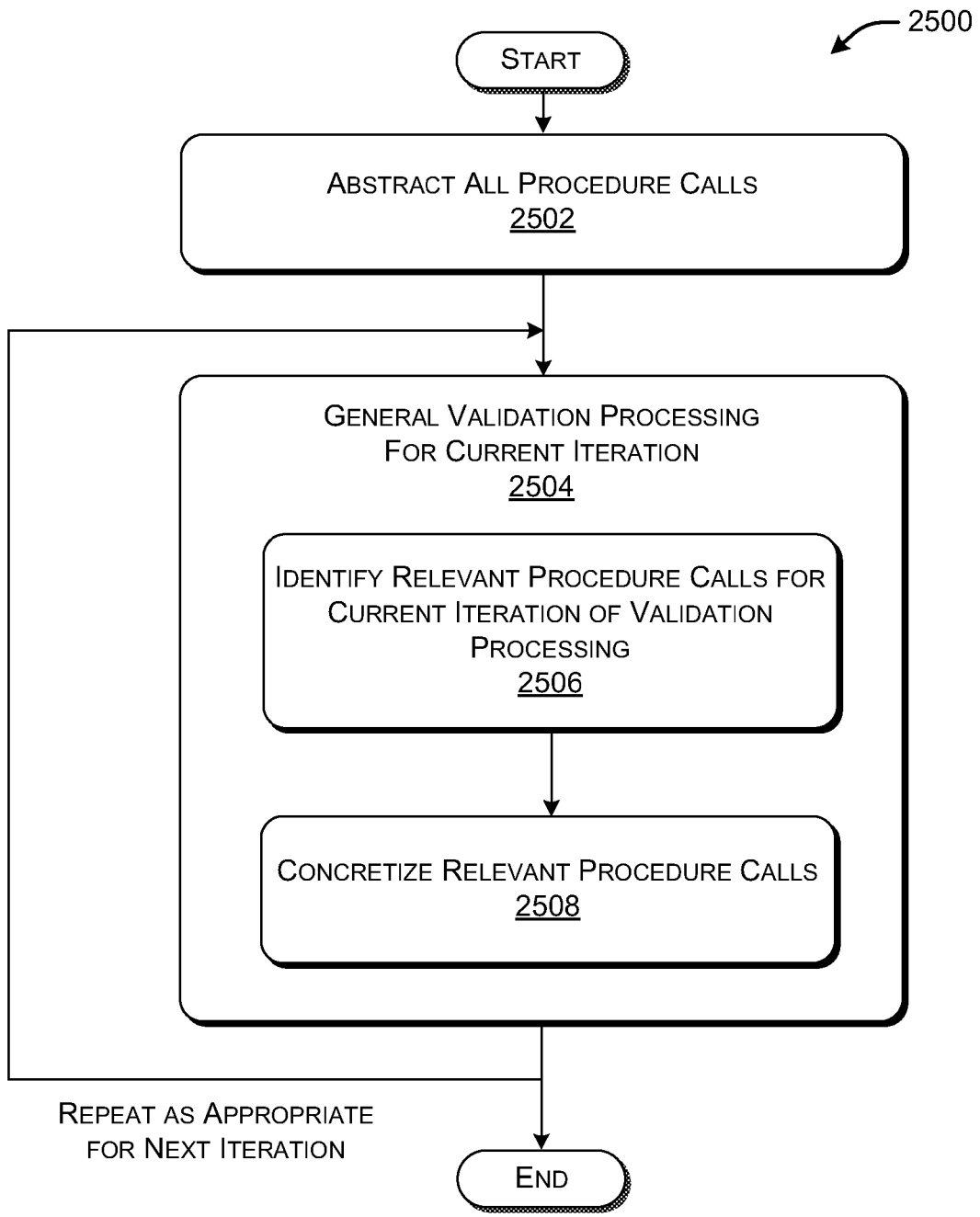
FIG. 25 is a flowchart that shows one manner in which the analysis engine can successively concretize procedure calls in a trace.

FIG. 25 shows a procedure 2500 which represents a refinement, referred to herein as abstract error trace processing. This feature corresponds to a generalization of the procedure bypass refinement technique introduced in the previous section (namely, in Subsection F.5).

In block 2502, the analysis engine 102 initially abstracts all procedure calls associated with a trace.

Block 2504 generally represents processing performed within a particular iteration of the CEGAR loop. In block 2506, for instance, the analysis engine 102 identifies procedure calls that are pertinent to the investigation of a particular safety property at the current point in time. The analysis engine 102 can apply the rules described above in making this decision (as described in Subsection F.5). In block 2508, the analysis engine 102 then selectively adds (or concretizes) those procedure calls (and procedure bodies) that are deemed relevant. If a procedure call is concretized, all the procedures that are called from it remain abstract, until rendered concrete based on the considerations described above. Once a procedure is concretized, it will remain as such over all subsequent iterations of CEGAR loop.

Abstract error traces have the following properties: (1) if the abstract error trace is feasible, then there exists a concrete trace in the original program that leads to the error; and (2) if the abstract execution trace is infeasible, then any concrete trace in the program that follows the abstract trace is also infeasible.

These two properties of abstract error traces mean that feasible abstract error traces are guaranteed to represent valid concrete error traces in the input program. For infeasible abstract error traces, the analysis engine 102 can proceed by iteratively concretizing abstract procedure calls on the trace in the manner described above. In this way, procedure calls that can be bypassed are ignored until they can no longer be bypassed. This technique improves performance and scalability of the analysis by reducing the size of the error trace and the Boolean program, and hence, by accelerating model checking.

G.2. On-the-Fly Identification of New Verification Targets

Figure 26:
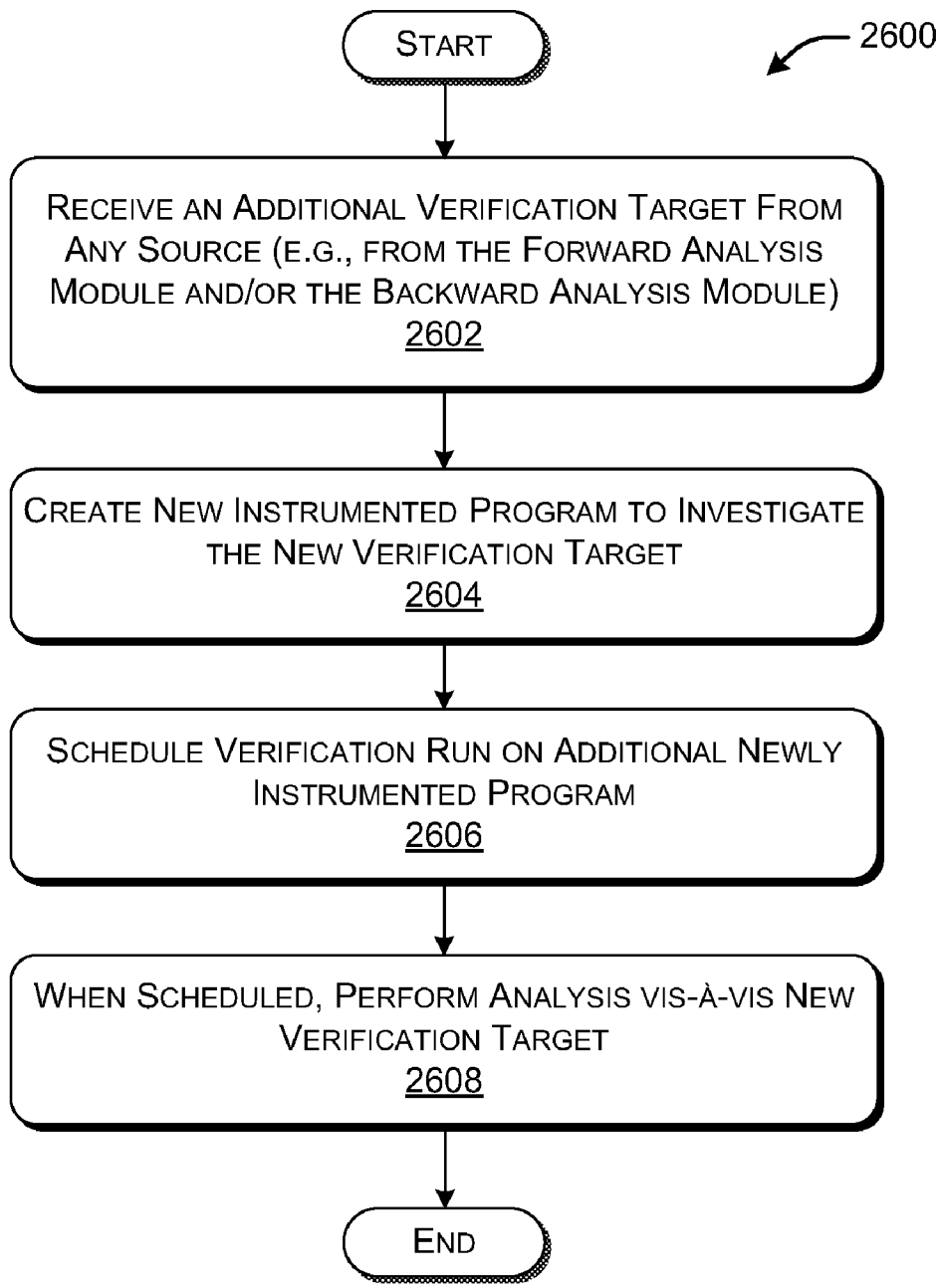
FIG. 26 is a flowchart that shows one manner in which the analysis engine can generate new verification targets in an on-the-fly manner.

FIG. 26 shows a procedure 2600 which represents another refinement of the operations performed by the analysis engine 102. Namely, this procedure 2600 allows the analysis engine 102 to identify and investigate additional verification targets in the course of its analysis.

In block 2602, the forward analysis module 310 and/or the backward analysis module 312 (and/or some other component of the analysis engine 102) can detect certain inconsistencies in the course of trace validation, suggestive of a defect above and beyond a current safety property currently under investigation. For example, the forward analysis module 310 may encounter a dereferencing pointer that has NULL as its symbolic value. This may or may not correspond to an actual error in the input program. The module that discovers such potential errors (e.g., the forward analysis module 310 or the backward analysis module 312) can store these cases in the information store 316 as possible new verification targets.

In block 2604, the analysis engine 102 can create a new instrumented program to investigate the potential errors. (Alternatively, the analysis engine 102 can defer this instrumentation operation until a later time.) In block 2606, the analysis engine 102 can schedule a verification run to investigate these potential errors. For example, the analysis engine 102 can address these new potential errors upon completing the current verification run. Alternatively, the analysis engine 102 can perform one or more verification runs in parallel. In block 2608, when scheduled, the analysis engine 102 can carry out any scheduled verification tasks to determine whether the potential errors represent actual errors.

A management module of the analysis engine 102 (not shown in FIG. 3) can manage the above-described tasks, e.g., by storing new verification targets, scheduling new verification tasks, and initiating the verification tasks.

G.3. Refinement in the Processing of Programs with Loops

Figure 27:
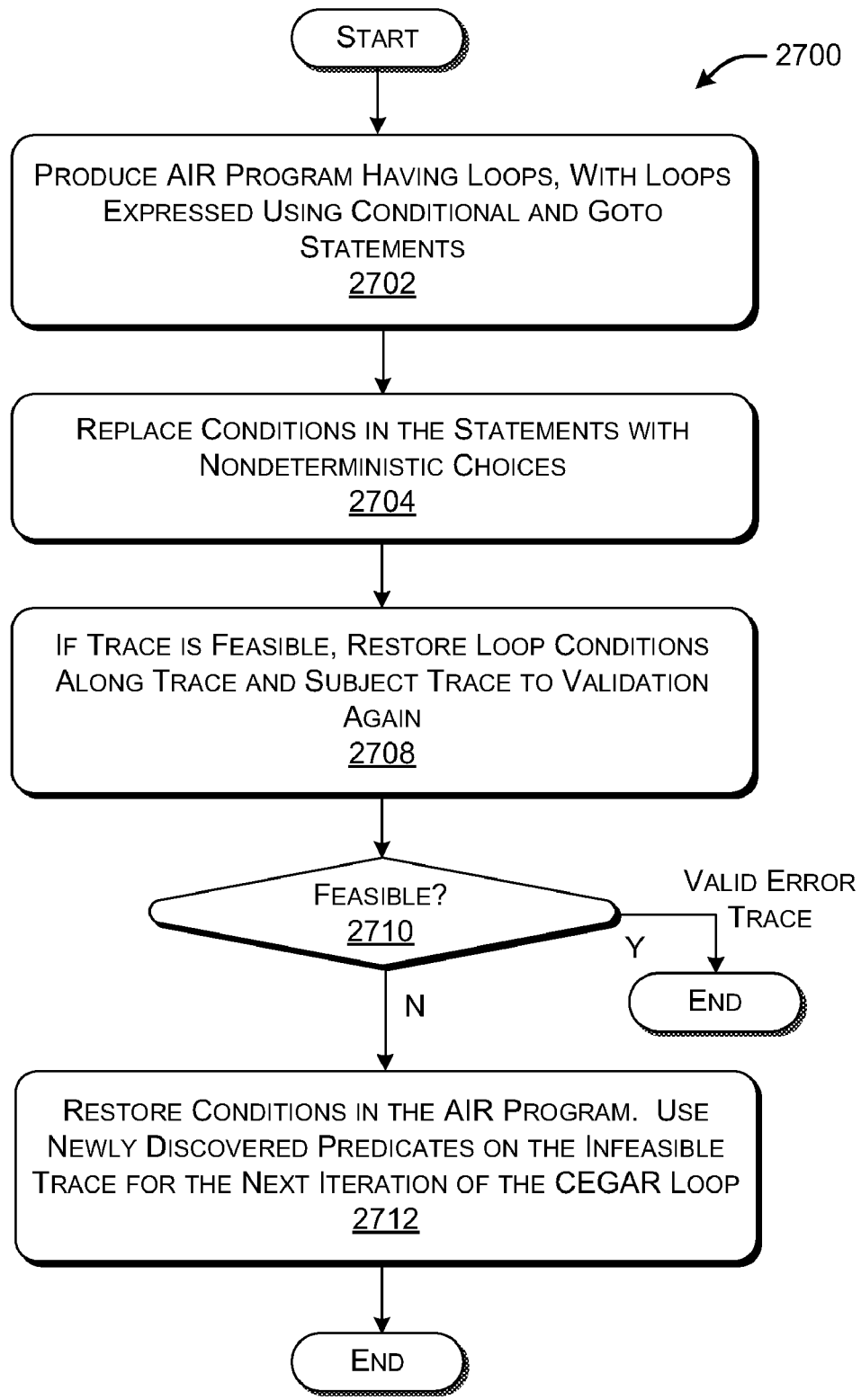
FIG. 27 is a flowchart that shows one manner in which the analysis engine can iteratively introduce loop conditions into a CEGAR loop on an as-needed basis.

FIG. 27 shows a procedure 2700 that represents another refinement that can improve the performance of the analysis engine 102. This procedure 2700 pertains to a refined technique for handling loop conditions in error trace validation.

In block 2702, the analysis engine 102 produces an AIR program based on an input program that contains loops. The AIR program expresses the loops in the input program via conditional and goto statements.

In block 2704, the analysis engine 102 initially replaces the conditions in those statements with non-deterministic choices to simplify abstraction and error trace validation.

In block 2708, assuming that an error trace proves to be feasible, the analysis engine 102 restores the loop conditions along the trace. The analysis engine 102 then again subjects the trace to validation.

In block 2710, the analysis engine determines whether the trace again proves to be feasible. If so, the analysis engine 102 reports the trace to the user as a valid error trace. Otherwise, in block 2712, the analysis engine 102 restores the conditions in the AIR program. At this point, the analysis engine 102 uses the new predicates discovered by the backward analysis module 312 on the (infeasible) trace for the next iteration of the CEGAR loop. This technique allows for incremental verification with respect to loops and improves performance of the analysis engine 102 on programs with loops.

Recall that the procedure 2700 is invoked in the master procedure 400 shown in FIGS. 4-6, e.g., as a last resort provision in block 612. In that context, the analysis engine 102 restores loops conditions (if they exist to restore) in the AIR program, as per block 2712 of FIG. 27.

H. Representative Processing Functionality

FIG. 28 sets forth illustrative electrical data processing functionality 2800 that can be used to implement any aspect of the functions described above. With reference to FIGS. 1 and 2, for instance, the type of processing functionality 2800 shown in FIG. 28 can be used to implement any aspect of the system 100, including the analysis engine 102. In one case, the processing functionality 2800 may correspond to any type of computing device that includes one or more processing devices.

The processing functionality 2800 can include volatile and non-volatile memory, such as RAM 2802 and ROM 2804, as well as one or more processing devices 2806. The processing functionality 2800 also optionally includes various media devices 2808, such as a hard disk module, an optical disk module, and so forth. The processing functionality 2800 can perform various operations identified above when the processing device(s) 2806 executes instructions that are maintained by memory (e.g., RAM 2802, ROM 2804, or elsewhere). More generally, instructions and other information can be stored on any computer readable medium 2810, including, but not limited to, static memory storage devices, magnetic storage devices, optical storage devices, and so on. The term computer readable medium also encompasses plural storage devices. The term computer readable medium also encompasses signals transmitted from a first location to a second location, e.g., via wire, cable, wireless transmission, etc.

The processing functionality 2800 also includes an input/output module 2812 for receiving various inputs from a user (via input modules 2814), and for providing various outputs to the user (via output modules). One particular output mechanism may include a presentation module 2816 and an associated graphical user interface (GUI) 2818. The processing functionality 2800 can also include one or more network interfaces 2820 for exchanging data with other devices via one or more communication conduits 2822. One or more communication buses 2824 communicatively couple the above-described components together.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for validating a candidate trace produced by a Counter-Example Guided Abstraction Refinement (CEGAR) loop, the candidate trace associated with a potential error within a program, the method comprising:
    performing forward analysis in a forward direction along the candidate trace to collect information pertaining to the candidate trace, the information comprising values of variables stored during the forward analysis;
    performing backward analysis in a backward direction along the candidate trace on the basis of at least the values of the variables stored during the forward analysis,
    the forward analysis and the backward analysis identifying whether the candidate trace represents a feasible trace or an infeasible trace; and
    generating, for the case of the infeasible trace, at least one predicate for use in removing the infeasible trace from a subsequent iteration of the CEGAR loop in an instance when said at least one predicate can be discovered,
    wherein the method is performed by one or more processing devices.

2. The method of claim 1, wherein the candidate trace corresponds to a path through a program abstraction having plural blocks, wherein at least one of the blocks represents a grouping of plural statements of the program abstraction.

3. The method of claim 1, wherein the forward analysis comprises:
    identifying a contradiction in a step of the candidate trace;
    forming a subtrace that terminates with the step having the contradiction; and
    passing the subtrace to the backward analysis in lieu of the candidate trace in its entirety.

4. The method of claim 1, wherein:
    the backward analysis comprises:
    forming an aggregate state condition for a step in the candidate trace, wherein the aggregate state condition represents a conjunction of state conditions associated with the step; and
    determining whether the aggregate state condition is satisfiable or unsatisfiable, said forming and determining providing a pyramid data structure of aggregate state conditions when repeated for successive steps advancing in the backward direction along the candidate trace,
    said generating of at least one predicate comprises selecting one or more predicates on the basis of information provided in the pyramid data structure, and
    said selecting comprises selecting said at least one predicate from a single column of the pyramid data structure.

5. The method of claim 1, wherein:
    the backward analysis comprises:
    forming an aggregate state condition for a step in the candidate trace, wherein the aggregate state condition represents a conjunction of state conditions associated with the step; and
    determining whether the aggregate state condition is satisfiable or unsatisfiable, said forming and determining providing a pyramid data structure of aggregate state conditions when repeated for successive steps advancing in the backward direction along the candidate trace,
    said generating of at least one predicate comprises selecting one or more predicates on the basis of information provided in the pyramid data structure, and
    said selecting comprises selecting said at least one predicate from plural columns of the pyramid data structure in an instance when said at least one predicate cannot be obtained from a single column of the pyramid data structure.

6. The method of claim 1, wherein:
    the backward analysis comprises:
    forming an aggregate state condition for a step in the candidate trace, wherein the aggregate state condition represents a conjunction of state conditions associated with the step; and determining whether the aggregate state condition is satisfiable or unsatisfiable, said forming and determining providing a pyramid data structure of aggregate state conditions when repeated for successive steps advancing in the backward direction along the candidate trace, said generating of at least one predicate comprises selecting one or more predicates on the basis of information provided in the pyramid data structure, and said generating comprises selecting said at least one predicate by processing the candidate trace beyond a contradiction that is encountered in the candidate trace and by ignoring at least one previously-encountered predicate.

7. The method of claim 1, wherein said generating of said at least one predicate comprises selecting one or more auxiliary predicates, said one or more auxiliary predicates relating to a current set of new predicates in a current iteration of the CEGAR loop.

8. The method of claim 7, wherein said one or more auxiliary predicates correspond to any one or more of:
an if condition predicate associated with a condition of an if statement;
a pointer value predicate associated with a pointer value; or
an individual auxiliary predicate obtained from inter-procedural analysis.

9. The method of claim 1, wherein the backward analysis further comprises:
identifying an individual predicate that does not affect a procedure call associated with the candidate trace; and
inactivating the individual predicate with respect to the procedure call, such that the individual predicate does not contribute to the backward analysis that is performed within a procedure body associated with the procedure call.

10. The method of claim 1, wherein the backward analysis further comprises:
identifying relevant procedure calls for analysis in a current iteration of analysis, the relevant procedure calls being initially abstracted; and
selectively concretizing the relevant procedure calls,
wherein said identifying and concretizing operate to successively concretize the relevant procedure calls on an as-needed basis over plural iterations of the CEGAR loop.

11. The method of claim 1, wherein the backward analysis further comprises:
detecting local pointers that have not been initialized within a body of a procedure associated with the candidate trace; and
inserting a statement at the beginning of the procedure which specifies that the local pointers are distinct.

12. The method of claim 1, further comprising:
identifying at least one additional verification target; and
performing analysis with respect to said at least one additional verification target.

13. A system comprising:
an analysis engine configured to perform static analysis, the analysis engine comprising:
an abstract IR generating (AIR-generating) module configured to receive an instrumented intermediate representation (IR) program associated with an input program, and based thereon, produce an abstract IR (AIR) program, the AIR program including plural blocks, at least one of the blocks including plural statements of the IR program;
a Boolean program-generating module configured to generate a Boolean program based on the AIR program and a current set of predicates, the Boolean program-generating module transforming individual blocks of the AIR program into a Boolean form using respective transformers;
a model checking module configured to identify a candidate trace using the Boolean program, the candidate trace associated with a potential error in the AIR program; and
a validation module configured to determine whether the candidate trace represents a feasible trace or an infeasible trace, and, in an instance when the candidate trace is infeasible, generate at least one new predicate for use in removing the infeasible trace from subsequent analysis of the AIR program, in an instance when said at least one new predicate can be discovered,
the validation module comprising:
a forward analysis module configured to operate in a forward direction along the candidate trace to collect information pertaining to the candidate trace; and
a backward analysis module configured to operate in a backward direction along the candidate trace on the basis of the information collected in the forward analysis, and
one or more processing devices configured to execute the analysis engine.

14. The system of claim 13, wherein the analysis engine is configured to be: independent of an input language of the input program; and independent of a level of granularity of the plural blocks.

15. The system of claim 13, further comprising functionality configured to replace conditions associated with loops in the AIR program with non-deterministic choices, and to restore the conditions on an as-needed basis in a course of processing the AIR program using the analysis engine.

16. A system comprising:
one or more storage devices comprising computer readable instructions which, when executed by the one or more processing devices, cause the one or more processing devices to perform the method of claim 1, and
the one or more processing devices.

17. A system comprising:
one or more storage devices comprising computer readable instructions which, when executed by the one or more processing devices, cause the one or more processing devices to perform the method of claim 4, and
the one or more processing devices.

18. A system comprising:
one or more storage devices comprising computer readable instructions which, when executed by the one or more processing devices, cause the one or more processing devices to perform the method of claim 5, and
the one or more processing devices.

19. A system comprising:
one or more storage devices comprising computer readable instructions which, when executed by the one or more processing devices, cause the one or more processing devices to perform the method of claim 6, and
the one or more processing devices.

20. A method for validating a candidate trace produced by a Counter-Example Guided Abstraction Refinement (CEGAR) loop, the candidate trace associated with a potential error within a program, the method comprising:
performing forward analysis in a forward direction along the candidate trace and truncating the candidate trace to provide a subtrace;
performing backward analysis in a backward direction along the subtrace that is provided by the forward analysis,
the backward analysis identifying whether the subtrace represents a feasible trace or an infeasible trace; and generating, for the case of the infeasible trace, at least one predicate for use in removing the infeasible trace from a subsequent iteration of the CEGAR loop in an instance when said at least one predicate can be discovered, wherein the method is performed by one or more processing devices, and wherein the performing forward analysis comprises truncating the candidate trace at a point of contradiction identified by the forward analysis.

21. A system comprising:
one or more storage devices comprising computer readable instructions which, when executed by the one or more processing devices, cause the one or more processing devices to perform the method of claim 20, and
the one or more processing devices.

* * * * *